(12) United States Patent
Wiseman

(10) Patent No.: US 12,411,053 B2
(45) Date of Patent: Sep. 9, 2025

(54) INTERCHANGEABLE DIRECTIONAL DIFFERENTIAL PRESSURE DETECTOR

(71) Applicant: AirFlow Direction, Inc., Amesbury, MA (US)

(72) Inventor: Brian M. Wiseman, Amesbury, MA (US)

(73) Assignee: AirFlow Direction, Inc., Amesbury, MA (US)

( * ) Notice: Subject to any disclaimer, the term of this patent is extended or adjusted under 35 U.S.C. 154(b) by 327 days.

(21) Appl. No.: 18/137,003

(22) Filed: Apr. 20, 2023

(65) Prior Publication Data

US 2023/0341284 A1 Oct. 26, 2023

Related U.S. Application Data

(60) Provisional application No. 63/333,932, filed on Apr. 22, 2022, provisional application No. 63/333,448, filed on Apr. 21, 2022.

(51) Int. Cl.
*G01L 19/06* (2006.01)
*G01C 9/34* (2006.01)
(Continued)

(52) U.S. Cl.
CPC ............ *G01L 19/0663* (2013.01); *G01C 9/34* (2013.01); *G01L 13/00* (2013.01); *G01L 19/0007* (2013.01)

(58) Field of Classification Search
CPC . G01L 19/147; G01L 9/0072; G01L 19/0645; G01L 19/0084; G01L 13/025;
(Continued)

(56) References Cited

U.S. PATENT DOCUMENTS 2,497,255 A 2/1950 Brown
2,542,442 A 2/1951 Weber
(Continued)

FOREIGN PATENT DOCUMENTS

CN 2200816 Y 6/1995
CN 102928020 A 2/2013
(Continued)

OTHER PUBLICATIONS

International Search Report and Written Opinion for International Application No. PCT/US2023/019202, mailed Jul. 27, 2023.
(Continued)

*Primary Examiner* — Andre J Allen
(74) *Attorney, Agent, or Firm* — Wolf, Greenfield & Sacks, P.C.

(57) ABSTRACT

A system for mounting a differential pressure indication device for indicating a presence of a directional differential pressure between a first space and a second space separated from the first space by a barrier is provided. The system may include a base configured to be mounted against the barrier, where the base includes a receptacle configured to removably receive the pressure indication device. The system may include at least one mounting fastener configured to removably secure the differential pressure indication device within the receptacle. The system may include a pitch adjuster configured to secure the base to the barrier, where movement of the pitch adjuster is configured to adjust a spacing between a portion of the base and the barrier to adjust the orientation of the base with respect to pitch.

60 Claims, 10 Drawing Sheets

(51) Int. Cl.
*G01L 13/00* (2006.01)
*G01L 19/00* (2006.01)

(58) Field of Classification Search
CPC ............. G01L 19/0007; G01L 19/0038; G01L 9/0042; G01L 9/0073; G01L 9/0075; G01L 9/0054; G01L 9/0055; G01L 9/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 9/0076; G01L 7/08; G01L 9/0025; G01L 9/0035; G01L 9/0005; G01L 9/0041; G01L 19/0061; G01L 21/00; G01L 9/0019; G01L 9/08; G01L 9/10; G01L 11/006; G01L 19/086; G01L 9/0008; G01L 1/18; G01L 9/00; G01L 11/004; G01L 19/069; G01L 9/0057; G01L 19/083; G01L 19/10; G01L 19/16; G01L 19/06; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 23/16; G01L 7/088; G01L 7/163; G01L 9/0007; G01L 13/06; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 23/00; G01L 9/0094; G01L 9/144; G01L 9/0082; G01L 1/125; G01L 9/0097; G01L 1/146; G01L 1/2268; G01L 11/06; G01L 21/30; G01L 21/34; G01L 23/221; G01L 7/187; G01L 7/20; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 5/24; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106
USPC .................................................. 73/700–756
See application file for complete search history.

(56) References Cited

U.S. PATENT DOCUMENTS

| 3,397,319 | A | 8/1968 | Locke |
| 3,815,542 | A | 6/1974 | Cooper |
| 3,930,568 | A | 1/1976 | Levey |
| 4,040,650 | A | 8/1977 | Shotbolt |
| 4,139,466 | A | 2/1979 | Rosaen |
| 4,154,101 | A | 5/1979 | Buchanan et al. |
| 4,271,693 | A | 6/1981 | Bute |
| 4,486,744 | A | 12/1984 | Pratt et al. |

(56) References Cited

U.S. PATENT DOCUMENTS

| | | |
|---|---|---|
| 4,679,827 A | 7/1987 | Law |
| 4,787,251 A | 11/1988 | Kolodiski |
| 4,819,577 A | 4/1989 | Campau |
| 5,195,376 A | 3/1993 | Banks et al. |
| 5,291,182 A | 3/1994 | Wiseman |
| 5,343,753 A | 9/1994 | Boutin |
| 5,410,298 A | 4/1995 | Wiseman |
| 5,461,910 A | 10/1995 | Hodson |
| 5,522,261 A | 6/1996 | Grover et al. |
| 5,589,643 A | 12/1996 | Pyle |
| 5,661,461 A | 8/1997 | Wiseman |
| 5,787,919 A | 8/1998 | Pyle |
| 5,798,697 A | 8/1998 | Wiseman |
| 5,981,877 A | 11/1999 | Sakata et al. |
| 6,477,896 B1 | 11/2002 | Nyberg |
| 6,506,974 B2 | 1/2003 | Nakata |
| 6,569,219 B1 | 5/2003 | Connor et al. |
| 6,725,731 B2 | 4/2004 | Wilklund et al. |
| 7,891,311 B2 | 2/2011 | Logan et al. |
| 8,003,014 B2 | 8/2011 | Breay et al. |
| 8,910,516 B2 | 12/2014 | Wiseman |
| 9,395,260 B2 | 7/2016 | Pyle |
| 10,191,077 B2 | 1/2019 | Wiseman |
| 10,571,482 B2 | 2/2020 | Wiseman |
| 10,690,560 B2 | 6/2020 | Wiseman |
| 10,942,197 B2 | 3/2021 | Wiseman |
| 11,340,127 B2 | 5/2022 | Wiseman |
| 11,415,475 B2 | 8/2022 | Wiseman |
| 11,415,477 B2 * | 8/2022 | Wiseman ............ G01L 19/0092 |
| 11,415,594 B2 | 8/2022 | Wiseman |
| 11,423,918 B2 | 8/2022 | Wiseman |
| 11,454,644 B2 | 9/2022 | Wiseman |
| 11,460,481 B2 | 10/2022 | Wiseman |
| 11,644,376 B2 | 5/2023 | Wiseman |
| 11,733,116 B2 | 8/2023 | Wiseman |
| 11,789,035 B2 | 10/2023 | Wiseman |
| 12,181,354 B2 * | 12/2024 | Wiseman ................ G01L 13/06 |
| 2009/0301213 A1 | 12/2009 | Barmettler et al. |
| 2011/0094294 A1 | 4/2011 | Townsend et al. |
| 2014/0260594 A1 | 9/2014 | Wiseman |
| 2015/0059464 A1 | 3/2015 | Wiseman |
| 2017/0067929 A1 | 3/2017 | Wiseman |
| 2018/0164174 A1 | 6/2018 | Wiseman |
| 2018/0292281 A1 | 10/2018 | Bailly et al. |
| 2019/0154724 A1 | 5/2019 | Wiseman |
| 2020/0158749 A1 | 5/2020 | Wiseman |
| 2020/0278268 A1 | 9/2020 | Wiseman |
| 2020/0378854 A1 | 12/2020 | Wiseman |
| 2020/0379000 A1 | 12/2020 | Wiseman |
| 2020/0379001 A1 | 12/2020 | Wiseman |
| 2021/0215561 A1 | 7/2021 | Wiseman |
| 2021/0239729 A1 | 8/2021 | Wiseman |
| 2021/0247257 A1 | 8/2021 | Wiseman |
| 2022/0178777 A1 | 6/2022 | Wiseman |
| 2022/0206035 A1 | 6/2022 | Wiseman |
| 2022/0244124 A1 | 8/2022 | Wiseman |
| 2023/0031263 A1 | 2/2023 | Wiseman |

FOREIGN PATENT DOCUMENTS

| | | |
|---|---|---|
| CN | 104520681 A | 4/2015 |
| FR | 2 428 845 A1 | 1/1980 |
| GB | 394 145 | 6/1933 |
| WO | WO 98/52050 | 11/1998 |
| WO | WO 2014/150755 A1 | 9/2014 |
| WO | WO 2015/179516 A1 | 11/2015 |
| WO | WO 2018/098339 A1 | 5/2018 |
| WO | WO 2020/243512 A1 | 12/2020 |
| WO | WO 2021/081255 A1 | 4/2021 |

OTHER PUBLICATIONS

[No Author Listed] Preqator; From The Wayback Machine. Screenshots taken Oct. 5, 2021 at https://web.archive.org/web/20131126025813/http://preqatool.se/Preqatool/Preqator.html of Wayback Machine Capture for http://preqatool.se/Preqatool/Preqator.html dated Nov. 26, 2013, 3 pages.

[No Author Listed] Preqator; From The Wayback Machine. Screenshots taken Oct. 5, 2021 at https://web.archive.org/web/20161026213515/http://preqatool.se/Preqatool/Preqator.html of Wayback Machine Capture for http://preqatool.se/Preqatool/Preqator.html dated Oct. 26, 2013, 3 pages.

[No Author Listed] Preqator; www.preqatool.se/Preqatool/Preqator.html. Screenshots taken Oct. 5, 2021, 3 pages.

[No Author Listed] Preqator-Original; www.preqatool.se/Preqatool/Preqator-Original.html. Screenshots taken Oct. 5, 2021, 3 pages.

[No. Author Listed] Preqator-med hållare; www.preqatool.se/Preqatool/Preqator-med_hallare.html; Screenshots taken Oct. 5, 2021, 6 pages.

[No. Author Listed] Preqator-med Hållare (alt. 1); http://preqatool.se/Preqatool/Preqator-_med_2_Hallare_(alt_1).html. Screenshots taken Oct. 5, 2021, 2 pages.

[No. Author Listed] Preqator-med Hållare (alt. 2); http://preqatool.se/Preqatool/Preqator_-_med_2_Hallare_alt ._ 2).html. Screenshots taken Oct. 5, 2021, 2 pages.

[No. Author Listed] Bestsålling; http://preqatool.se/Preqatool/BESTALLNING.html. Screenshots taken Oct. 5, 2021, 2 pages.

[No. Author Listed] Preqator; www.preqatool.se/Preqatool/Preqator.html. Webpage printed Oct. 9, 2020, 3 pages.

[No. Author Listed] Preqator-Original; www.preqatool.se/Preqatool/Preqator-Original.html. Webpage printed Oct. 9, 2020, 3 pages.

[No. Author Listed] Preqator-med hållare; www.preqatool.se/Preqatool/Preqator-med_hallare.html. Webpage printed Oct. 9, 2020, 4 pages.

[No. Author Listed] Preqator-med Hållare (alt. 1); http://preqatool.se/Preqatool/Preqator-med_2_Hallare_(alt_1).html. Webpage printed Oct. 9, 2020, 2 pages.

[No. Author Listed] Preqator-med Hållare (alt. 2); http://preqatool.se/Preqatool/Preqator_-med_2_Hallare_alt._ 2).html. Webpage printed Oct. 9, 2020, 2 pages.

* cited by examiner

INTERCHANGEABLE DIRECTIONAL DIFFERENTIAL PRESSURE DETECTOR

RELATED APPLICATIONS

This application claims the benefit of priority under 35 U.S.C. § 119(e) to U.S. Provisional Application No. 63/333,932, filed on Apr. 22, 2022, and U.S. Provisional Application No. 63/333,448, filed on Apr. 21, 2022. The contents of these applications are incorporated herein by reference in their entirety.

FIELD

Disclosed embodiments relate to methods and apparatuses for detecting the presence of a directional differential pressure.

DISCUSSION OF THE RELATED ART

Various applications within hospitals, laboratories, pharmaceutical facilities, clean room facilities, etc., often require a particular direction of air flow or differential pressure to be maintained, such as between neighboring rooms, compartments, corridors, ducts, or other spaces. The pressure of a room relative to adjacent space(s) will determine the net direction of air flow through an opening into or out of the room. For example, a hospital operating room may be kept under a positive pressure so that air flows out of the room, thereby preventing unfiltered or contaminated air from entering the room from adjacent spaces. This positive pressure is accomplished by supplying clean air to the operating room at a greater flow rate than the flow rate at which air is exhausted from the room by the room's ventilation system. Alternatively, if a hospital patient is infected with an airborne communicable pathogen, a patient isolation room may be kept under a negative pressure which is accomplished when the rate at which potentially contaminated air is exhausted from the room is greater than the rate at which air is supplied to the room from the room's ventilation system. Such a negative pressure arrangement, where the room is under a comparatively lower pressure than its immediate surroundings, prevents potentially contaminated air from exiting the room and escaping into surrounding space(s).

A net differential pressure between rooms will cause air to flow through an opening from one room to the other in the direction from a higher pressure to a lower pressure. The desired degree of differential pressure to be maintained between rooms, compartments, corridors, etc. will vary, depending on the application. Accordingly, the general direction of potential or actual air flow between compartments may be monitored, and in some cases the particular magnitude of differential pressure causing the net air flow.

SUMMARY

In some embodiments, a mounting device for mounting a differential pressure indication device for indicating a presence of a directional differential pressure between a first space and a second space separated from the first space by a barrier, includes a base configured to be mounted against the barrier, where the base includes a receptacle configured to receive the pressure indication device, at least one mounting fastener configured to removably secure the differential pressure indication device within the receptacle, a pitch adjuster configured to secure the base to the barrier, where movement of the pitch adjuster is configured to adjust a spacing between a portion of the base and the barrier, at least one mounting opening formed in the base and configured to receive a fastener, a pitch indicator disposed on the base and configured to indicate an orientation of the base with respect to pitch, and a roll indicator disposed on the base and configured to indicate an orientation of the base with respect to roll.

In some embodiments, a system includes a differential pressure indication device for indicating a presence of a directional differential pressure between a first space and a second space separated from the first space by a barrier. The differential pressure indication device includes a mount, a conduit portion in fluidic connection with the first space and the second space, where the conduit portion is connected to the mount, and a movable element disposed within the conduit portion and movable from a first, vertically lower region of the second conduit portion to a second, vertically higher region of the second conduit portion in response to the directional differential pressure between the first space and the second space being greater than a threshold differential pressure. The system also includes a mounting device for mounting the differential pressure indication device to the barrier. The mounting device includes a base configured to be mounted against the barrier, where the base includes a receptacle in which the mount is removably disposed, at least one mounting fastener configured to removably secure the mount within the receptacle, a pitch adjuster configured to secure the base to the barrier, where movement of the pitch adjuster is configured to adjust a spacing between a portion of the base and the barrier, a pitch indicator disposed on the base and configured to indicate an orientation of the base with respect to pitch, and a roll indicator disposed on the base and configured to indicate an orientation of the base with respect to roll.

In some embodiments, a differential pressure indication device for indicating a presence of a directional differential pressure between a first space and a second space separated from the first space by a barrier, includes a mount configured to be mounted to the barrier, a pitch adjuster configured to secure the mount to the barrier, where movement of the pitch adjuster is configured to adjust a spacing between a portion of the mount and the barrier to adjust a pitch of the mount, a conduit portion in fluidic connection with the first space and the second space, where the conduit portion is connected to the mount, and a movable element disposed within the conduit portion and movable from a first, vertically lower region of the conduit portion to a second, vertically higher region of the conduit portion in response to the directional differential pressure between the first space and the second space being greater than a threshold differential pressure.

In some embodiments, a differential pressure indication device for indicating a presence of a directional differential pressure between a first space and a second space separated from the first space by a barrier, includes a mount configured to be mounted to the barrier, where the mount includes a receptacle and a passageway; a conduit portion in fluidic connection with the first space and the second space, where the conduit portion is received in the receptacle to connect the conduit portion to the mount, where the passageway is configured to fluidically connect the conduit portion to the second space, and where the passageway receives at least a portion of the conduit portion, and a movable element disposed within the conduit portion and movable from a first, vertically lower region of the conduit portion to a second, vertically higher region of the conduit portion in response to the directional differential pressure between the first space and the second space being greater than a threshold differential pressure.

Advantages, novel features, and objects of the present disclosure will become apparent from the following detailed description of the present disclosure when considered in conjunction with the accompanying drawings, which are schematic, and which are not intended to be drawn to scale. For purposes of clarity, not every component is labeled in every figure, nor is every component of each embodiment of the present disclosure shown where illustration is not necessary to allow those of ordinary skill in the art to understand the present disclosure.

BRIEF DESCRIPTION OF DRAWINGS

The accompanying drawings are not intended to be drawn to scale. In the drawings, some identical or nearly identical components that are illustrated in various figures are represented by a like numeral. Various embodiments of the present disclosure will now be described, by way of example, with reference to the accompanying drawings. The embodiments and drawings shown are not intended to narrowly define the present disclosure. In the drawings.

DETAILED DESCRIPTION

Figure 1:
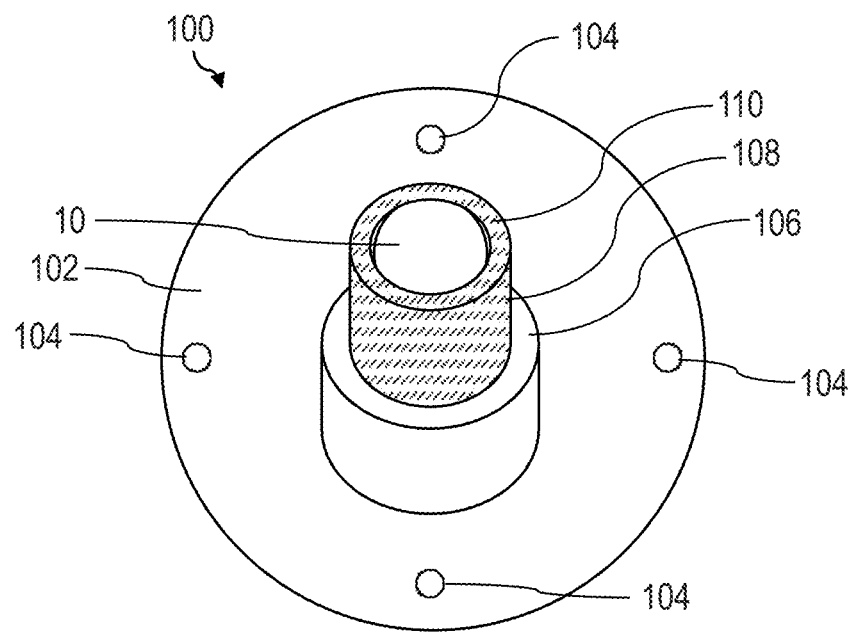
FIG. 1 is a front view of one embodiment of a device for indicating a presence of a directional differential pressure between a first space and a second space.

In some cases, it may be desirable to provide an indication of a differential pressure between two spaces. For example, in clean room environments, medical environments, manufacturing environments, and others, it may be desirable to maintain a positive or negative differential pressure in a space. In some cases, such a positive or negative pressure may not be perceptible to users of the space. Accordingly, a differential pressure indicator may be used in such cases to provide a visual indication of the presence of a differential pressure. In some cases, a physical, movable element may be used which is responsive to air flow and/or the differential pressure between two spaces. In such cases, the movement of the movable element may be subject to influence from gravity and the setting of an appropriate reference position for the device containing the movable element. For example, where an inclined conduit is employed containing a movable element, the particular inclination may be set such that a specific differential pressure overcomes the effect of gravity and moves the movable element up the inclined conduit. Accordingly, variability in the inclination of the conduit, or otherwise having difference in orientation compared to a desired reference frame may affect the accuracy of a differential pressure indication. In some conventional differential pressure indicators, installation of the device to a barrier while ensuring the reference frame of the differential pressure indicator is adjusted to match the desired reference frame may be difficult and time consuming. For example, where a wall is not vertical (e.g., plumb), the orientation of a device mounted to that wall may correspondingly be out of plumb without specifically tuned adjustments.

In view of the above, the inventor has appreciated the benefits of a device for indicating a differential pressure between two spaces that may be easily installed and adjusted to compensate for the variability in installation barriers. In particular, the inventor has appreciated the benefits of a system including a base configured to allow an installer to manipulate the pitch and roll orientations of the base with respect to gravity while installing the base onto a barrier. In some embodiments, the base may allow the user to adjust the pitch and/or roll of the base while the base is coupled to the barrier, further simplifying the installation process. In some embodiments, the base may be configured to align with a vertical plane (e.g., parallel to a direction in which gravity acts). The base may compensate for a non-plumb barrier by allowing the base to vary in pitch with respect to the barrier. The base may also allow the base to vary in roll with respect to the barrier. Such an arrangement may ensure that a device supported by the base is aligned with its correct reference frame. In some embodiments, the base may include one or more indicators which indicate a pitch and/or roll of the base with respect to gravity to an installer. For example, the base may include a pitch level and a roll level that include a marker (e.g., a bubble, weighted ball, etc.) configured to indicate a pitch and/or roll of the base to an installer. In some embodiments, a pitch indicator may indicate an alignment with a desired pitch angle (e.g., a pitch corresponding to the correct reference frame for the supported device). In some embodiments, a roll indictor may indicate alignment with a desired roll angle (e.g., a roll corresponding to the correct reference frame for the supported device. In some embodiments, a device may have a correct reference frame of zero pitch and zero roll with respect to gravity (e.g., a mount of the device may be aligned in a vertical plane), though other reference frames may be employed.

In addition to the above, the inventor has appreciated that spaces in which differential pressure indicators are employed may change over time in terms of their differential pressure amount, direction, or variability. For example, a designed differential pressure amount between two spaces may be changed (e.g., the pressure may be raised or lowered). As another example, the differential pressure may be changed from a constant to a variable differential pressure with different amounts for different activities in a space. In such instances, it may be desirable to provide a device configured to provide a differential pressure set point indication that may be altered or interchanged without disturbing an appropriately installed base with a calibrated reference frame. In some conventional devices for indicating a differential pressure, the entire device may be removed from the wall to be able to change features of the device (e.g., adjustability, set point, etc.).

In view the above, the inventor has appreciated the benefits of a base for a device that is configured to allow various device arrangements to be interchanged and/or adjusted without disturbing calibration of the base with respect to a desired reference frame. The inventor has also appreciated that such a base plate may accommodate a variety of different device arrangements from indicating differential pressure while providing a consistent reference frame, allowing the devices and the base to be manufactured separately and therefore reducing complexity and cost of each distinct device. Pressure indication devices of exemplary embodiments herein may be couplable with a single base and may be interchanged to provide adjustable pressure set points, fixed pressure set points, different visibility of a movable element, or different set point indicator as desired.

The present disclosure relates to devices and systems which provide an indication of potential or actual directional air flow and/or whether a particular degree of directional differential pressure exists between spaces (e.g., two neighboring rooms or a room and an adjacent corridor) separated by a barrier such as a wall. In some embodiments, the device includes a first component located on a first side of a barrier, and a second component located on a second side of the barrier such that each component is subject to the air pressure within its respective space. The overall device is adapted to react to pressure differences between the two spaces to provide an indication to a viewer of the device.

An air flow conduit may extend from one space to another space (e.g., room to hallway or hallway to a room that is separated by an anteroom between them). According to some embodiments, a visual indicator such as a lightweight ball or other movable element moves within the conduit in response to differences in air pressures between the two spaces. For example, in some embodiments, the air pressure in a room may be higher than in an adjacent hallway, and if the difference surpasses a threshold pressure, the movable element may move toward an end of the conduit to indicate the pressure difference exceeding the threshold. A user may view the movable element in the conduit to receive an indication as to the presence of a differential pressure between the two spaces.

An air flow conduit does not necessarily require that the conduit be arranged to permit air to be transferred from one space to another. Instead, the pressures on opposite sides of a wall may communicate without air flow moving all the way through the air flow conduit. For example, a conduit may pass from a hallway to a room, and a piston may be positioned with within the conduit. If pressure in the room is sufficiently higher than in the hallway to surpass a threshold pressure differential, the piston may move toward the hallway and be visible within the conduit in the hallway. If the piston is sealed within the interior of the conduit, no room air escapes into the hallway space, though a small amount of air flows behind the piston within the conduit. In this manner, the air flow conduit may provide a fluidic connection between two spaces where some minor air flow occurs within the conduit, yet no air is transmitted from one space to the other.

As discussed further below, in other embodiments, the fluidic connection may allow air to be transmitted between two spaces until a ball seats against an end of a conduit. In still further embodiments, air flows from one space to another even when a ball (or other movable element) reaches the end of its travel path. For purposes herein, when a first component is described as being fluidically connected to a space or to a second component, intermediate components may be present as part of the fluidic connection. In some embodiments, components fluidically connected to a space or a second component may be directly connected via the fluid with no intermediate components.

In some embodiments, a device for indicating a differential pressure between two spaces includes one or more conduits in communication with the air in both spaces such that a movable element disposed in the conduit(s) can react to directional air flow caused by the differential pressure. As described further herein, the conduit(s) may extend through the wall, or reside predominantly on one side of the wall, and adjustability of the incline of portions of the device may reside on a single side of the wall in some embodiments. The movable element (e.g., at least one ball) is disposed within a passageway of the conduit and moves freely back and forth along at least a portion of the length of the conduit. Restraints or stops may be located at the ends or at other areas of the conduit to contain the ball within the conduit. The stops may have openings that allow fluid (e.g., air, gas, liquid, water vapor, etc.) to flow through the passageway of the conduit from one end to an opposite end.

According to some embodiments of the present disclosure, a base is provided which provides for ease of installation. For example, in some embodiments, the base is arranged such that once the base is mounted to a barrier (e.g., a wall), the base is oriented with a desired reference frame. The base may include a pitch indicator and/or a roll indicator to aid the installer in confirming the proper orientation and angles of pitch and roll. In this manner, if a specific reference frame is desired, the base can provide that reference frame. Once the base is mounted, a simplified device can be installed on the base with a conduit portion inclined such that a threshold pressure is set to the desired set point. In some embodiments, the device may be non-adjustable, such that the inclination of the conduit portion is constant with respect to the base. In some such embodiments potentially unwanted changes to the set point can be inhibited. For example, tampering with the set point may be discouraged with such an arrangement. In other embodiments, the device may be adjustable, such that the inclination of the conduit is adjustable with respect to the base. As the base establishes a desired reference frame, the devices installed in base are known to be accurate without further calibration.

According to some embodiments, the combination of a roll indicator and a pitch indicator with base provides an arrangement which permits the installer and/or user to confirm that a later installed device may be set at a desired threshold pressure set point. For example, in such an arrangement, an installer can orient the base until the roll indicator shows that the baseplate is at the desired roll angle. The pitch indicator then may be used to confirm that the pitch of the base is at the desired angle. With the roll at the desired orientation, the pitch indicator is useable to confirm the pitch of base is in the desired orientation. The pitch and/or roll may be adjusted by an installer such that the desired orientation is reached. If the roll indicator were not present, and the roll orientation were not confirmed, the pitch indicator may not work in some embodiments. Or, in some embodiments, the pitch indicator may falsely indicate a correct pitch of the base if the roll orientation is not actually at the desired orientation. In this manner, the combination of the roll indicator and pitch indicator provides a base which may be correctly set to a desired orientation. A device may then be mounted to the base without the need for extra equipment and/or burdensome calibration procedures.

According to some embodiments of the present disclosure, a viewer of the detector is able to check whether the device is calibrated by checking the orientation of the base. An out-of-calibration base may result in a mounted device indicating a pressure differential which is not actually present, and the actual pressure differential may not meet infection control or contamination standards. The inventor has recognized that it can be advantageous to have the base arranged such that calibration can be performed using components which form part of the base such that external calibration instruments and/or procedures may be avoided in some embodiments.

According to some embodiments, a device may have a first conduit portion which is configured to pass through a wall, and a second conduit portion which is angled relative to the first conduit portion. The first and second conduit portions may be fixed to each other in such a manner (e.g., integrally formed) such that rotation of one portion rotates the other portion. In this manner, if the first portion is fixed to the wall such that the first portion cannot rotate, the inclination of the second portion relative to a horizontal plane remains fixed.

For purposes herein, references to a "horizontal plane" refer to a plane which is perpendicular to the direction of the force of gravity. "Vertical plane" refers to a plane which is parallel to the direction of the force of gravity.

According to some embodiments, a conduit portion of a device within which a movable element travels is inclined relative to a horizontal plane when a pitch indicator of a base indicates that the base is at a desired pitch. For example, the pitch indicator may be a pitch level (e.g., bubble level), and when the pitch level shows that the pitch level is horizontal, the conduit portion may be inclined relative to the horizontal plane.

For purposes herein, a base may be considered to be oriented vertically when its barrier-contacting surface has an orientation that the base would have if it were to be placed against and secured to a smooth, vertical surface. That is, when referencing a "vertically oriented base," the orientation of the base would be the same as when the base is placed against and secured to a smooth, vertical surface. Referencing a vertically oriented base to explain the inclination or orientation of another component does not require a base to be vertically oriented or to be secured to a vertical barrier.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a front view of one embodiment of a device 100 for indicating a presence of a directional differential pressure between a first space and a second space. As shown in FIG. 1, the device includes a mount 102. The mount may be cylindrical in some embodiments as shown in FIG. 1. In some embodiments, the mount may be disk-shaped. In some embodiments, the mount may be configured as a flange. The mount includes two holes 104. The holes 104 are disposed on opposing sides of the mount relative to a center portion of the mount. The holes are each configured to receive a fastener (e.g., a screw) that may be employed to secure the device to a mounting device, as will be discussed further with reference to FIG. 5. In other embodiments, any number of mounting holes may be employed, as the present disclosure is not so limited. In some embodiments, the mount may include at least two holes, such that an orientation of the mount may be fixed when fasteners are received in the at least two holes. In some embodiments, the holes 104 may be symmetrically arranged around a circumference of the mount 102.

As shown in FIG. 1, the device includes a conduit portion 108 that is configured to be fluidically connected to the first space and the second space. Accordingly, a movable element 10 disposed in the conduit may move in response to a threshold differential pressure between the first space and the second space. In particular, the movable element may move between a first end and a second end of the conduit portion 108. In the embodiment of FIG. 1, the movable element is configured as a ball, though any suitable movable element may be employed, as the present disclosure is not so limited. In the embodiment of FIG. 1, the conduit portion 108 is fixed relative to the mount 102. The conduit portion 108 is inclined relative to the mount 102, such that when the mount is aligned with a vertical plane, the conduit portion 108 is inclined relative to a horizontal plane. Accordingly, the conduit portion may not move (e.g., rotate) relative to the mount. In some embodiments as shown in FIG. 1, the device 100 includes a collar 106 configured to support the conduit portion 108. In some embodiments as shown in FIG. 1, the collar may be opaque and configured to hide the movable element 10 when a threshold differential pressure is not present. In contrast, the conduit portion 108 is translucent or transparent, such that the movable element 10 is visible when the threshold differential pressure is present. In some embodiments, the collar may be translucent or transparent and the conduit portion 108 may be opaque. In some other embodiments, visibility of the ball may indicate a threshold differential pressure is not present, whereas invisibility of the ball (e.g., when the ball is disposed in the collar 106 and concealed) may indicate the threshold differential pressure is present. In some embodiments, the conduit portion includes a stop 110 configured to retain the movable element 10 within the conduit portion.

In the embodiment of FIG. 1, the conduit portion is inclined upward relative to a horizontal plane. In some cases, the device 100 may be inverted, such that the conduit portion is declined downward relative to a horizontal plane. For example, rotating the mount 102 clockwise or counterclockwise 180 degrees relative to the page (e.g., about an axis perpendicular to a plane of the mount 102) may invert the inclination of the conduit portion 108. Accordingly, the device 100 of FIG. 1 may be invertible depending on the direction of the differential pressure between a first space and a second space. The holes 104 formed in the mount 102 may be symmetrically disposed about the mount, such that the same holes on a mounting device or a barrier may be employed to mount the device 100 to the barrier in either orientation.

Figure 2:
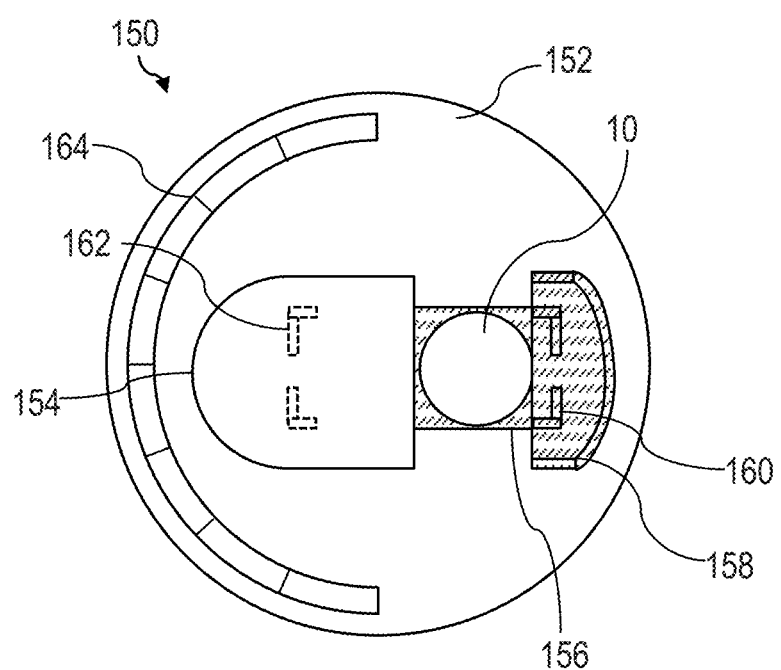
FIG. 2 is a front view of another embodiment of a device for indicating a presence of a directional differential pressure between a first space and a second space.

FIG. 2 is a front view of another embodiment of a device 150 for indicating a presence of a directional differential pressure between a first space and a second space. As shown in FIG. 2, the device includes a mount 152. The mount may be cylindrical in some embodiments as shown in FIG. 2. In some embodiments, the mount may be disk-shaped. In some embodiments, the mount may be configured as a flange. As shown in FIG. 2, the mount 152 does not include any mounting holes configured to receive fasteners. The mount of FIG. 2 is configured to be received in a receptacle of a mounting device which supports the device 150 without the use of holes on the mount itself (for example, see FIG. 6). In the embodiment of FIG. 2, the mount 152 is configured to be rotatably received in the receptacle, such that the device may be rotated about a rotation axis perpendicular to a plane of the mount 152.

As shown in FIG. 2, the device includes a conduit portion 156 that is configured to be fluidically connected to the first space and the second space. Accordingly, a movable element 10 disposed in the conduit may move in response to a threshold differential pressure between the first space and the second space. In particular, the movable element may move between a first stop 160 and a second stop 162 of the conduit portion 156. In the embodiment of FIG. 2, the movable element 10 is configured as a ball, though any suitable movable element may be employed in other embodiments, as the present disclosure is not so limited. In the embodiment of FIG. 2, the conduit portion 156 is fixed relative to the mount 102. Accordingly, rotation of the mount 152 may adjust the inclination of the conduit portion 156. In the embodiment of FIG. 2, the longitudinal axis of the conduit portion extends parallel to a plane of the mount 102. Accordingly, rotation about the rotation axis perpendicular to the plane of the mount 152 adjusts the inclination of the conduit portion. In some embodiments as shown in FIG. 2, the device 150 includes a collar 154 configured to support the conduit portion 156. In some embodiments as shown in FIG. 2, the collar may be opaque and configured to hide the movable element 10 when a threshold differential pressure is not present. In contrast, the conduit portion 156 is translucent or transparent, such that the movable element 10 is visible when the threshold differential pressure is present. In some embodiments, the collar may be translucent or transparent and the conduit portion 156 may be opaque. In some embodiments, visibility of the ball may indicate a threshold differential pressure is not present, whereas invisibility of the ball (e.g., when the ball is disposed in the collar 154) may indicate the threshold differential pressure is not present. In some embodiments, the conduit portion includes a dome 158 which may be configured to provide a fluidic connection to the conduit portion to a first space. In some embodiments, the dome may be translucent or transparent, such that the movable element 10 is visible through the dome. In some embodiments no dome may be employed, as the present disclosure is not so limited.

In some embodiments as shown in FIG. 2, the mount 152 includes a plurality of markings 164. The plurality of markings may be indicative of an inclination of the conduit portion 156, where the inclination of the conduit portion corresponds to a threshold differential pressure set point. In some embodiments, an arrow on a mounting device may point to one of the plurality of markings 164 to indicate the specific threshold differential pressure set point. The plurality of markings may be calibrated based on a desired reference frame to provide an indication to an installer or user as to the current threshold differential pressure. In some embodiments, the plurality of markings 164 may not be accurate if the mount 152 is not vertically disposed (e.g., aligned in a vertical plane).

Figure 3:
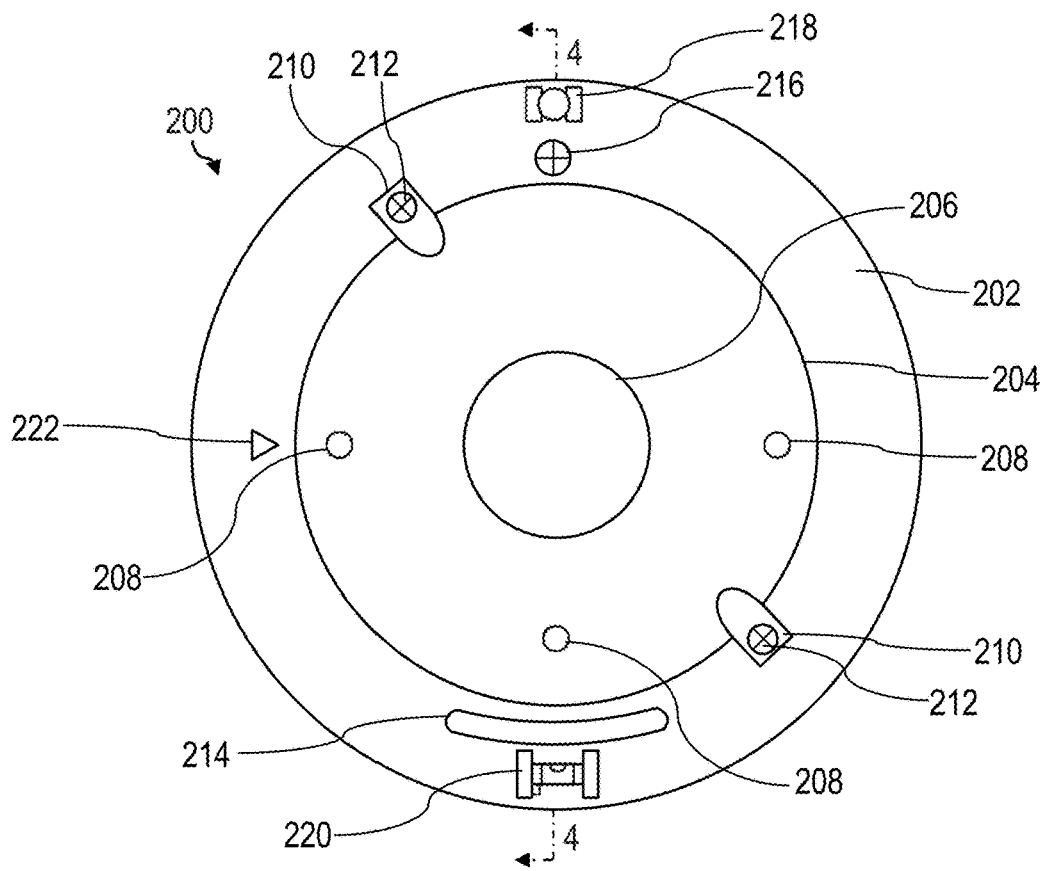
FIG. 3 is a front view of one embodiment of a mounting device configured to receive and support a differential pressure indication device for indicating a presence of a directional differential pressure according to exemplary embodiments described herein.

FIG. 3 is a front view of one embodiment of a mounting device 200 configured to receive and support a differential pressure indication device for indicating a presence of a directional differential pressure according to exemplary embodiments described herein. The mounting device includes a base 202 which is configured to be mounted to a barrier separating a first space and a second space. The base 202 includes a receptacle 204 that is configured to receive a mount of a differential pressure indication device. In the embodiment of FIG. 3, the receptacle is cylindrical, and is configured to receive a correspondingly shaped cylindrical mount. In some embodiments, the receptacle and the mount may be disk-shaped. The base 202 also includes a passageway 206 which is configured to fluidically connect a supported device to a first space and second space. In some embodiments, the passageway 206 may be a conduit configured to extend between the first space and the second space on opposing sides of a barrier. In some embodiments, the passageway may support a separate conduit configured to extend between the first space and the second space on opposite sides of the barrier.

As shown in FIG. 3, the mounting device 200 includes mounting fasteners configured to removable secure a differential pressure indication device within the receptacle 204. In the particular embodiment of FIG. 3, the mounting device includes two device mounting holes 208. The two mounting holes are disposed in the receptacle 204 and are configured to receive mounting fasteners. In some embodiments, the two mounting holes may be threaded and configured to receive threaded fasteners (e.g., screws). While two mounting holes are shown in FIG. 3, any suitable number of mounting holes may be employed in other embodiments, as the present disclosure is not so limited. The mounting device 200 also includes two tabs 210. The tabs are configured to cover a portion of the receptacle 204 so that a mount disposed in the receptacle may be secured to the mounting device. In some embodiments, the tabs may be rotatable between a locked position (e.g., shown in FIG. 3) and an unlocked position. In the unlocked position, the tabs may not cover any portion of the receptacle, such that a differential pressure indication device may be inserted or removed from the receptacle. In the embodiment of FIG. 3, the tabs 210 rotate about tab fasteners 212. In other embodiments, the tabs may not be rotatable. In some such embodiments, the tabs may be installed to cover portions of the receptacle with the tab fasteners. In some embodiments, the tab fasteners may be screws, and in some cases may be tamper resistant screws. In some embodiments, more than two tabs may be employed, as the present disclosure is not so limited. While exemplary mounting fasteners are shown in FIG. 3, any suitable mounting fasteners may be employed to secure a differential pressure indication device to the receptacle 204, as the present disclosure is not so limited. Additionally, multiple mounting fasteners of different types (e.g., screws, tabs, etc.) may be employed in combination to accommodate a variety of different differential pressure indication devices.

In the embodiment of FIG. 3, the mounting device also includes an arc-shaped slot 214 and a pitch adjuster 216. The arc-shaped slot may be formed in the base 202 and is configured to receive a fastener such as a screw. The shape of the arc-shaped slot is such that the base may be rotated in a roll orientation while a fastener is received in the arc-shaped slot. That is, while a fastener is loosely coupling the base to a barrier the base may be rotated about an axis perpendicular to a plane of the base 202. Once the base is in a desired orientation, the fastener may be tightened to fix the base in the desired orientation. While a single arc shaped slot is included in the embodiment of FIG. 3, in other embodiments multiple arc-shaped slots may be employed as the present disclosure is not so limited. Additionally, in some embodiments other openings of different shapes configured to receive fasteners may be employed, as the present disclosure is not so limited. The pitch adjuster 216 is configured as a fastener configured to couple the base 202 to a barrier. In some embodiments, the pitch adjuster may be configured as a screw or bolt configured to be rotated to secure the base to a barrier. The pitch adjuster is also configured to adjust a spacing between a portion of the base 202 and a barrier via rotation of the pitch adjuster. The functionality of the pitch adjuster will be discussed further with reference to exemplary FIGS. 4 and 9-10. In some embodiments, the roll orientation of the base 202 may be adjusted by rotating the base about the pitch adjuster 216.

According to the embodiment of FIG. 3, the mounting device includes a pitch indicator 218 and a roll indicator 220. The pitch indicator 218 is configured to indicate a pitch angle of the base 202 to a user. In some embodiments, the pitch indicator may be configured to indicate alignment of the base in a desired orientation with respect to pitch. For example, the pitch indicator may indicate alignment of the base 202 with a vertical plane. The pitch indicator may be responsive to gravity. In some embodiments, the pitch indicator may include a movable marker (e.g., air bubble, weighted ball, etc.) responsive to gravity. In some embodiments, the pitch indicator is a bubble level. The roll indicator 220 is configured to indicate a roll angle of the base 202 to a user. In some embodiments, the roll indicator may be configured to indicate alignment of the base in a desired orientation with respect to roll. The roll indicator may be responsive to gravity. In some embodiments, the roll indicator may include a movable marker (e.g., air bubble, weighted ball, etc.) responsive to gravity. In some embodiments, the roll indicator is a bubble level. While separate pitch and roll indicators are shown in FIG. 3, in other embodiments a single multi-axis indicator may be employed, as the present disclosure is not so limited. For example, a two-axis bubble level may be employed to indicate both a roll and a pitch of the base 202. Indication from the pitch indicator and the roll indicator as to the pitch and roll, respectively, may be employed to ensure that a differential pressure indication device supported by the mounting device is responsive to a correct threshold differential pressure. In the case of an adjustable differential pressure indication device supported by the barrier, the pitch and roll indicators may ensure that the adjustments of the differential pressure indication device are calibrated and accurate.

Figure 4:
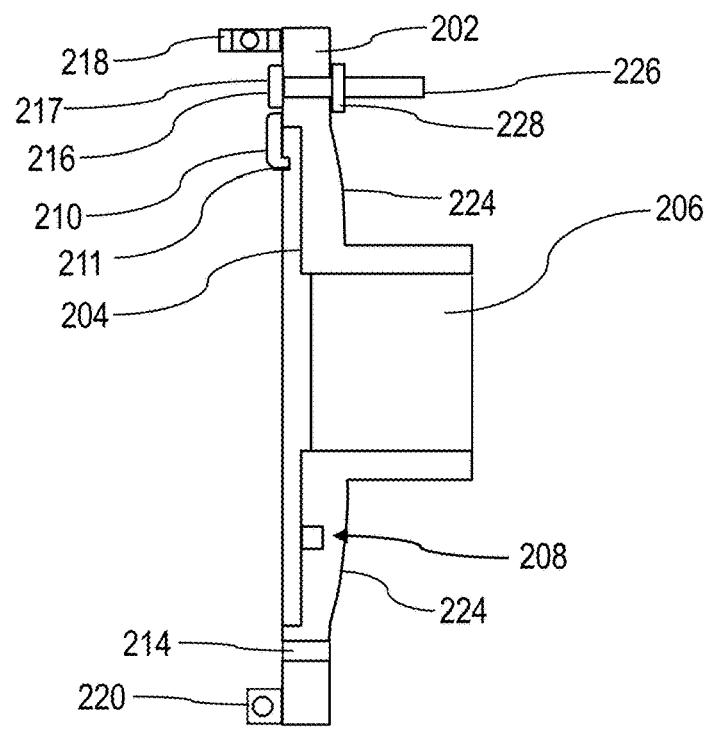
FIG. 4 is a cross-sectional view of the mounting device of FIG. 3 taken along line 4-4.

FIG. 4 is a cross-sectional view of the mounting device 200 of FIG. 3 taken along line 4-4. As shown in FIG. 4, the base 202 includes a receptacle 204 formed in the base. The receptacle may be a depression formed in the base. As shown in FIG. 4, the passageway 206 extends from the base and connects to the receptacle 204. In the embodiment of FIG. 4, the passageway and the base are integrally molded. In other embodiments the passageway may be separate from the base, as the present disclosure is not so limited. The passageway 206 may extend partially or entirely through a barrier. In other embodiments, the base may not extend into a barrier, as the present disclosure is not so limited.

According to the embodiment of FIG. 4, the base includes a curved surface 224. The curved surface 224 faces a barrier and may function as a barrier-contacting surface in some embodiments. In some embodiments, forces securing the base to the barrier may be transferred through the curved surface. The curved surface is convex such that as pitch of the base 202 is adjusted with respect to a barrier, the curved surface may maintain consistent engagement with a barrier. Such an arrangement may be beneficial to ensure that the base is sealed against a barrier. Such an arrangement may also be beneficial to ensure that the pitch of the base may be smoothly adjusted with the pitch adjuster 216. In some embodiments, the curved surface may cooperate with a gasket to provide a mounting interface for the base to a barrier. In other embodiments, a base may not include a curved surface, as the present disclosure is not so limited.

According to the embodiment of FIG. 4, the pitch adjuster 216 is configured as a screw including a head 217 and a shaft 226. The pitch adjuster also includes a clip 228 disposed on the shaft 226. The head 217 is disposed on one side of the base 202, and the clip 228 is disposed on a second, opposing side of the base 202. Accordingly, the base is captured between the head 217 and the clip 228. Rotation of the pitch adjuster may thread the shaft 226 into or out of a corresponding hole or anchor associated with a barrier. This movement of the pitcher adjuster will therefore adjust a spacing between the base 202 and the barrier at the portion surrounding the pitch adjuster. In this manner, the pitch adjuster may be used to adjust the pitch of the base independently from an attached barrier. Accordingly, if the barrier is not plumb (e.g., vertically disposed), the pitch adjuster may be employed to ensure the base 202 is plumb (e.g., vertically disposed) or in another desired orientation with respect to pitch independent of the barrier. The pitch adjuster is configured such that the pitch may be adjusted at the same time that the base is mounted to a barrier with the shaft 226. Of course, while a specific pitch adjuster configured as a screw is shown in FIG. 4, any pitch adjuster arrangement may be employed such as slidable shims that do not rotate to adjust the pitch of the base, as the present disclosure is not so limited.

According to the embodiment of FIG. 4, a tab 210 is shown. The tab 210 is configured to cover a portion of the receptacle 204 to secure a mount of a differential pressure indication device in the receptacle. In some embodiments as shown in FIG. 4, tabs may include a protrusion 211 extending toward the receptacle. The protrusion may engage a corresponding groove on a mount of a differential pressure indication device. The interlock between the protrusion and the mount may ensure securement of the mount within the receptacle. Additionally, in some embodiments the protrusion may provide a sliding surface on which a mount can slide such that the mount can be rotated. In other embodiments the tabs may be flat and may not include a protrusion, as the present disclosure is not so limited.

Figure 5:
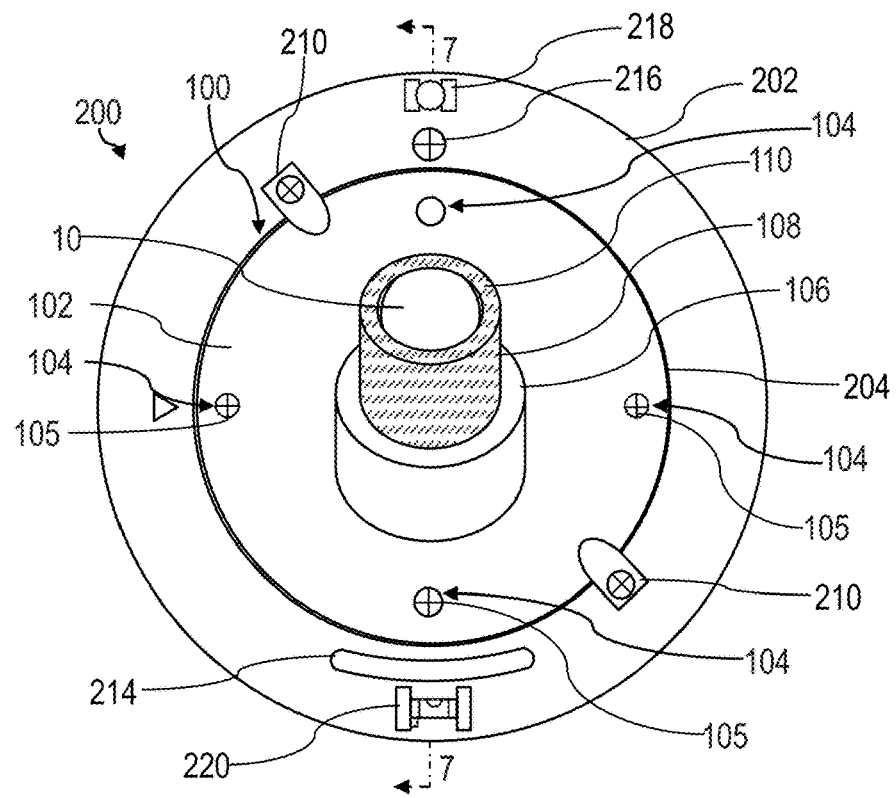
FIG. 5 is a front view of a system including the mounting device of FIG. 3 supporting the device of FIG. 1.

FIG. 5 is a front view of the mounting device 200 of FIG. 3 supporting the device 100 of FIG. 1. As shown in FIG. 5, the mount 102 is disposed in the receptacle 204. The mount 102 and the receptacle 204 have corresponding shapes. In the embodiment of FIG. 5, the mount and the receptacle both are cylindrical. In some embodiments, the mount and the receptacle may be disk-shaped. As shown in FIG. 5, fasteners 105 (e.g., screws, tacks, etc.) are disposed through the holes 104 formed in the mount 102. The fasteners are engaged with the corresponding holes formed in the receptacle (see FIG. 3). Accordingly, the mount is rigidly attached to the receptacle, such that the differential pressure indication device 100 is not able to rotate or move relative to the mounting device 200. In the embodiment of FIG. 5, the differential pressure indication device 100 may be inverted depending on the direction of a differential pressure between two spaces. The same fasteners 105 and holes 104 may be employed to secure the mount 102 to the receptacle 204 in either orientation. The threshold differential pressure corresponding to the movement of the movable element 10 within the conduit portion 108 may be predetermined based on the inclination of the conduit portion relative to a horizontal plane. The pitch indicator 218 and the roll indicator 220 may be employed to ensure the base 202 is aligned in a desired reference plane (e.g., aligned with a vertical plane) so that the conduit portion 108 has the desired inclination. Accordingly, if the base 202 has the desired orientation, the calibration of differential pressure indication device 100 is known. The location and alignment of the holes of the mount 102 with the holes of the receptacle may ensure the roll orientation of the conduit portion 108 is correct.

According to the embodiment of FIG. 5, the conduit portion 108 may be fluidically connected to a space on an opposite side of a barrier via a passageway formed in the receptacle 204 (e.g., see FIG. 4). Accordingly, the movable element 10 is responsive to a threshold differential pressure between a first space on one side of the barrier and a second space on another side of the barrier. In some embodiments, the differential pressure indication device 100 may include a conduit extending through the passageway of the receptacle. Such an arrangement may reduce or eliminate pressure leakage around the mount 102.

As shown in FIG. 5, the tabs 210 are covering a portion of the mount 102. Accordingly, the tabs assist the fasteners 105 in retaining the mount within the receptacle 204. In some embodiments, the tabs may be used to retain the mount 102 while the fasteners 105 are attached. For example, the mount may be placed in the receptacle and the tabs may be rotated to a locked position to secure the mount within the receptacle. In other embodiments, only the fasteners 105 may be employed to secure the mount to the receptacle, as the present disclosure is not so limited.

Figure 6:
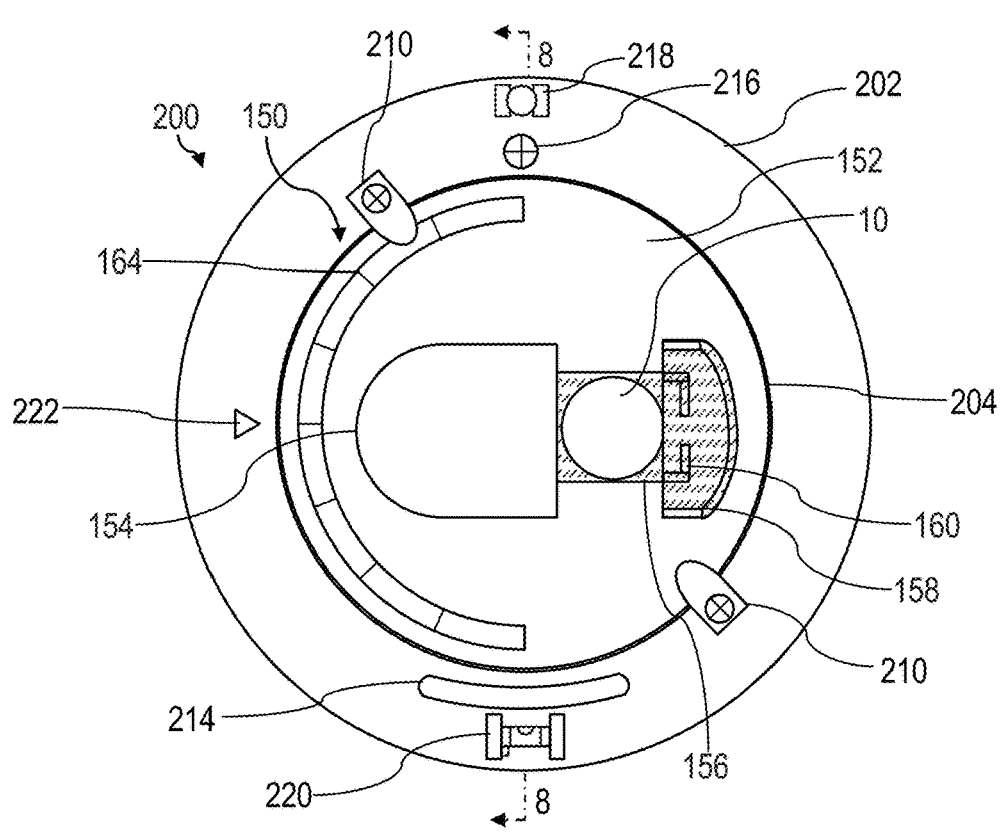
FIG. 6 is a front view of a system including the mounting device of FIG. 3 supporting the device of FIG. 2.

FIG. 6 is a front view of the mounting device 200 of FIG. 3 supporting the device 150 of FIG. 2. As shown in FIG. 6, the mount 152 is disposed in the receptacle 204. The mount 152 and the receptacle 204 have corresponding shapes. In the embodiment of FIG. 6, the mount and the receptacle both are cylindrical. In some embodiments, the mount and the receptacle may be disk-shaped. Accordingly, without additional fastening, the mount 152 is rotatable within the receptacle 204. The mount may be rotatable about a rotation axis perpendicular to a plane of the mount. In some embodiments, the rotation axis may be transverse to a barrier. In some embodiments, the rotation axis may be perpendicular to a barrier. As shown in FIG. 6, no fasteners are disposed in the mount 152. Rather, the tabs 210 cover a portion of the mount 152 to secure the mount within the receptacle 204. Accordingly, the mount is rotatably attached to the receptacle, such that the differential pressure indication device 150 is able to rotate or move relative to the mounting device 200.

According to the embodiment of FIG. 6, the threshold differential pressure corresponding to the movement of the movable element 10 within the conduit portion 156 may be based on the adjusted inclination of the conduit portion relative to a horizontal plane. A user may select a particular inclination depending on the desired threshold differential pressure. The mount 152 includes a plurality of markings 164 which are indicative of threshold differential pressure set points. The plurality of markings may be calibrated based on a desired reference frame of the mount 152. For example, the plurality of markings may be calibrated based on the mount being vertically disposed (e.g., aligned with a vertical plane). The pitch indicator 218 and the roll indicator 220 may be employed to ensure the base 202 is aligned in the desired reference plane (e.g., aligned with a vertical plane) so that the mount 152 has the correspondingly desired reference frame by way of its securement to the receptacle. Accordingly, if the base 202 has the desired orientation as indicated by the pitch indicator and the roll indicator, the calibration of differential pressure indication device 150 is known. The arrow 222 disposed on the base 202 may point to one of the plurality of markings 164 to indicate the threshold differential pressure set point.

According to the embodiment of FIG. 6, the conduit portion 156 may be fluidically connected to a space on an opposite side of a barrier via a passageway formed in the receptacle 204 (e.g., see FIG. 4). Accordingly, the movable element 10 is responsive to a threshold differential pressure between a first space on one side of the barrier and a second space on another side of the barrier. In some embodiments, the differential pressure indication device 150 may include a conduit extending through the passageway of the receptacle. Such an arrangement may reduce or eliminate pressure leakage around the mount 152. In some embodiments, the conduit may rotate with the mount 152 and conduit portion 156. In other embodiments, the conduit extending through the barrier may be rotatably coupled to the mount 152 and/or conduit portion 156, such that the conduit remains stationary while the mount 152 and conduit portion rotates.

Figure 7:
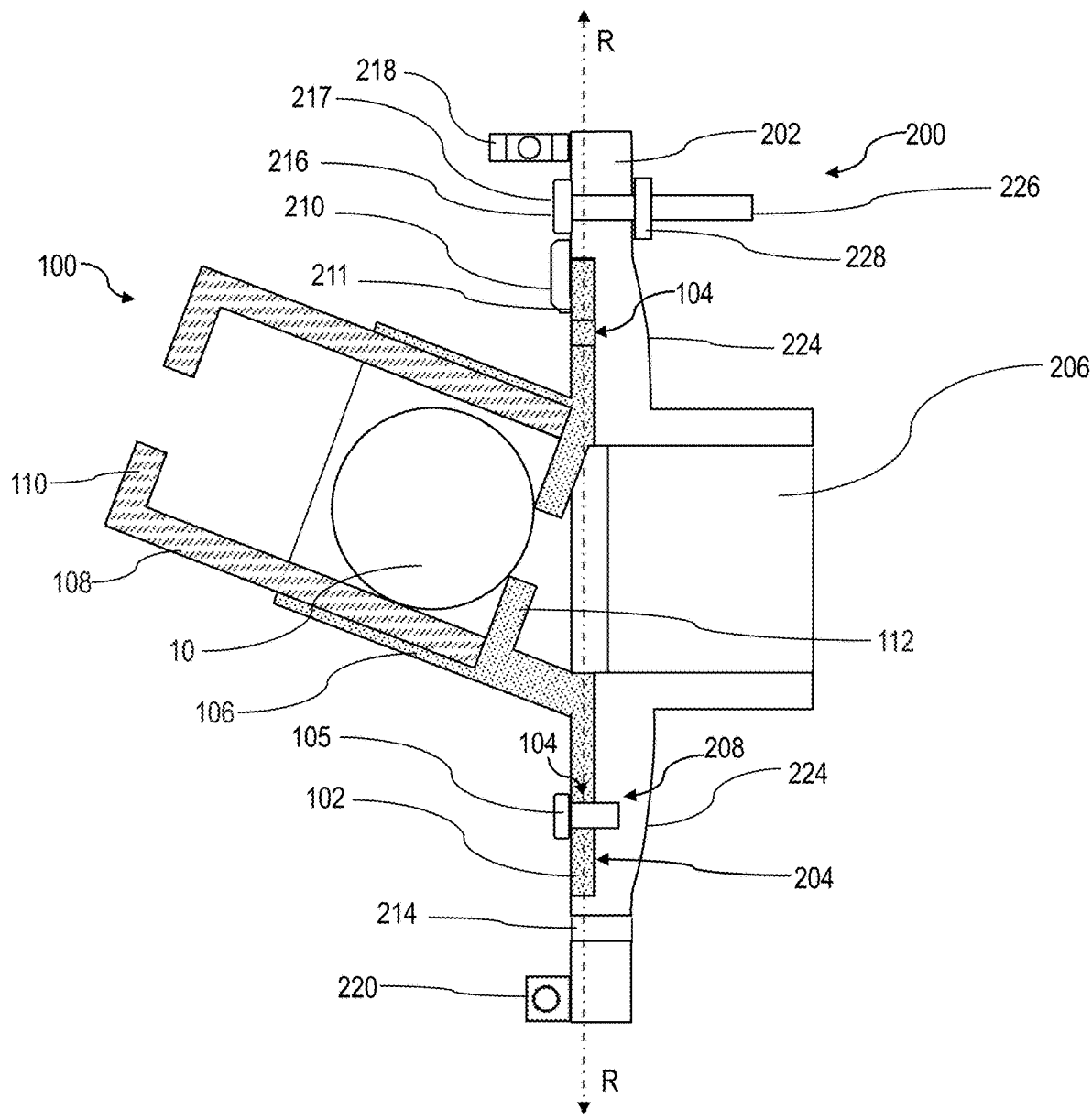
FIG. 7 is a cross sectional view of the system of FIG. 5 taken along line 7-7.

FIG. 7 is a cross sectional view of the system of FIG. 5 taken along line 7-7. As shown in FIG. 7, the mount 102 is disposed in the receptacle 204 of the mounting device. The mount 102 and the receptacle 204 have corresponding shapes. In the embodiment of FIG. 7, the mount and the receptacle both are cylindrical, which may allow the mount 102 to rotate within the receptacle 204 during installation. In some embodiments, the mount and the receptacle may be disk-shaped. As shown in FIG. 7, a fastener 105 (e.g., screws, tacks, etc.) are disposed through the holes 104 formed in the mount 102. The fasteners are engaged with the corresponding mounting holes 208 formed in the receptacle 204. Accordingly, the mount 102 in FIG. 7 is rigidly attached to the receptacle 204, such that the differential pressure indication device 100 is not able to rotate or move relative to the mounting device 200 once secured in the receptacle with one or more fasteners 105. In the embodiment of FIG. 7, the differential pressure indication device 100 may be inverted depending on the direction of a differential pressure between two spaces. In some embodiments, the same fasteners 105 in different holes 104 may be employed to secure the mount 102 to the receptacle 204 in either orientation of the two orientations. The threshold differential pressure corresponding to the movement of the movable element 10 within the conduit portion 108 may be predetermined (e.g., fixed) based on the inclination of the conduit portion relative to a horizontal plane. As discussed previously, the pitch indicator 218 and the roll indicator 220 may be employed to ensure the base 202 is aligned in a desired reference plane (e.g., aligned with a vertical plane) so that the conduit portion 108 has the desired inclination. Accordingly, if the base 202 has the desired orientation, the calibration of differential pressure indication device 100 is known. The location and alignment of the holes 104 of the mount 102 with the holes of the receptacle may ensure the roll orientation of the conduit portion 108 is correct.

As shown in FIG. 7, the conduit portion 108 is fluidically connected to a space on an opposite side of a barrier via a passageway 206 formed in the receptacle 204. Accordingly, the movable element 10 is responsive to a threshold differential pressure between a first space on one side of the barrier and a second space on another side of the barrier. In some embodiments as shown in FIG. 7, the conduit portion 108 is received in the collar 106 such that the collar supports the conduit portion. In some other embodiments, the conduit portion 108 may be formed continuously with a collar 106 (e.g., the conduit portion and collar may be formed integrally or may be attached to one another to form a travel path for the movable element), as the present disclosure is not so limited. In some other embodiments, a collar may be omitted, and in some such embodiments a conduit portion may have a translucent and opaque portions. As shown in FIG. 7, the pressure indication device may include one or more stops configured to limit the movement of the movable element 10 between a first indication position (e.g., indicative of the presence of a differential pressure between the two spaces) and a second indication position (e.g., indicative of the absence of a differential pressure between the two spaces). In some embodiments as shown in FIG. 7, the collar 106 may include a stop 112, which may engage the movable element 10 to prevent the movable element from moving into the passageway 206 in the second indication position (e.g., in the absence of a differential pressure). In some embodiments, the stop 112 may be formed as a part of the passageway 206. In some embodiments, the stop 112 may be formed as a part of the conduit portion 108. In some embodiments, the stop 112 may have an opening configured to be aligned with a center of the movable element 10, such that when the movable element abuts the stop 112, the movable element may close off the passageway 206. Such an arrangement may be beneficial to reduce or eliminate air transfer between the two spaces when a differential pressure is not present. As shown in FIG. 7, the conduit portion 108 may also include a stop 110 configured to prevent the movable element from moving out of the conduit portion 108 in the first indication position (for example, in the presence of a differential pressure). In some embodiments the stop 110 may be formed integrally with the conduit portion 108. In some embodiments, the stop 110 may be attached to the conduit portion separately. In some embodiments as shown in FIG. 7, a movable element 10 may be kept on one side of a receptacle plane R of the receptacle in both indication positions. Such an arrangement may be beneficial for mounting devices configured to be mounted to a thin barrier, such as a glass barrier, as the device for indicating pressure does not protrude past the receptacle 204 into the barrier.

As shown in FIG. 7, the tabs 210 are covering a portion of the mount 102. The tabs may assist the fasteners 105 in retaining the mount within the receptacle 204. In some embodiments, the tabs may be used to retain the mount 102 while the fasteners 105 are attached. For example, the mount may be placed in the receptacle and the tabs may be rotated to a locked position to secure the mount within the receptacle. In some embodiments, a protrusion 211 of the tab 210 may be received into a corresponding slot or hole of the mount 102. In other embodiments, the tab 210 may not include a protrusion, and may sit flush with the mount 102. As noted previously, in some embodiments the tabs 210 may be omitted and only fasteners 105 are used to secure the mount 102 to the receptacle 204.

Figure 8:
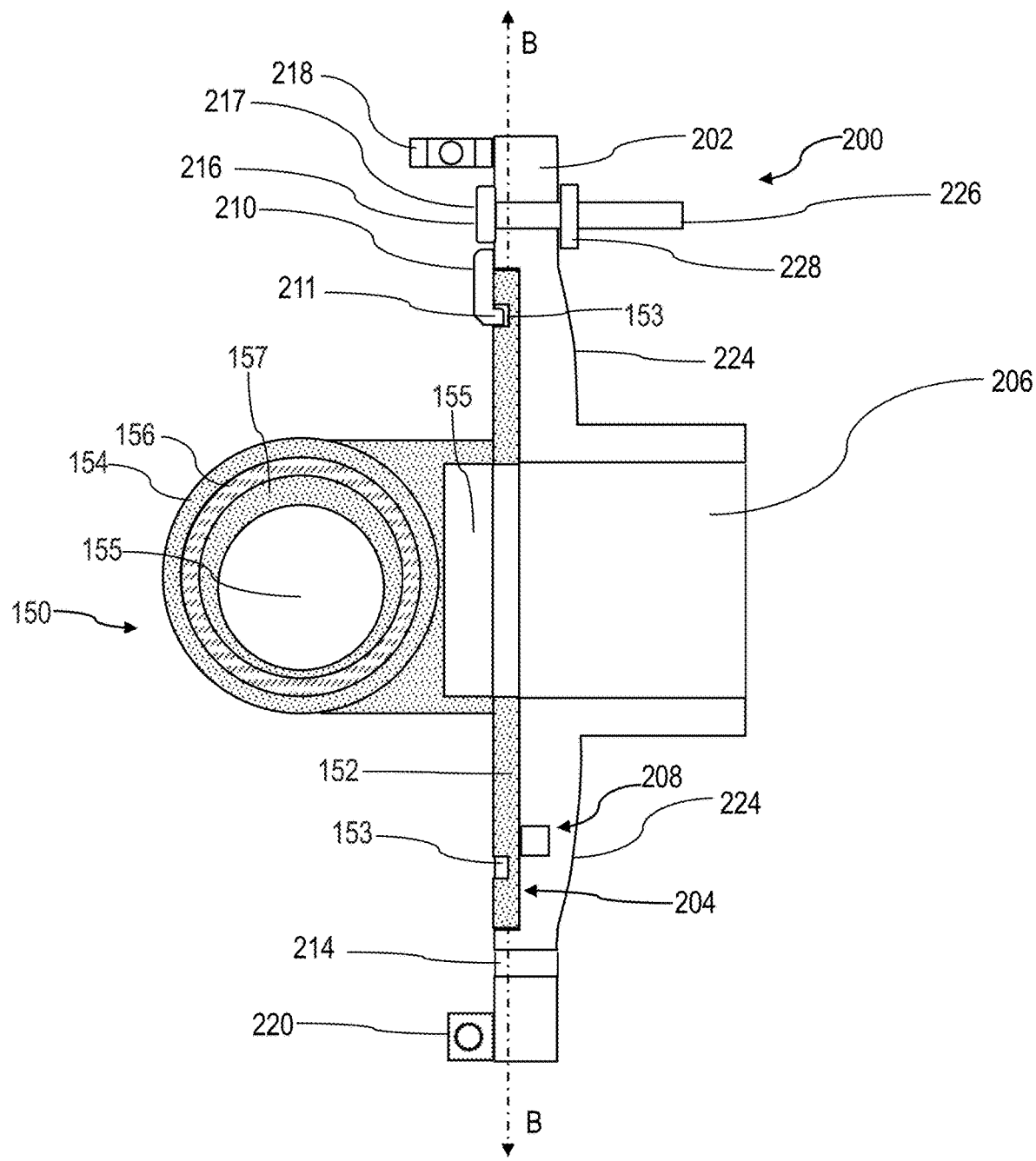
FIG. 8 is a cross sectional view of the system of FIG. 6 taken along line 8-8.

FIG. 8 is a cross sectional view of the system of FIG. 6 taken along line 8-8. As shown in FIG. 8, the mount 152 is disposed in the receptacle 204. The mount 152 and the receptacle 204 have corresponding shapes. In the embodiment of FIG. 8, the mount and the receptacle both are cylindrical. In some embodiments, the mount and the receptacle may be disk-shaped. Accordingly, without additional fastening, the mount 152 is rotatable within the receptacle 204. The mount may be rotatable about a rotation axis perpendicular to a plane of the mount. In some embodiments, the rotation axis may be transverse to a barrier. In some embodiments, the rotation axis may be perpendicular to a barrier. As shown in FIG. 8, no fasteners are disposed in the mount 152. Rather, the tabs 210 cover a portion of the mount 152 to secure the mount within the receptacle 204. In some embodiments as shown in FIG. 8, a protrusion 211 of the tabs 210 may be received in a slot 153 formed in the mount 152. In other embodiments, the tabs 210 may not include a protrusion and may sit flush with the mount 152. In some such embodiments, the mount 152 may not include a slot 153. Accordingly, in the embodiment of FIG. 8, the mount 152 is rotatably attached to the receptacle 204, such that the differential pressure indication device 150 is able to rotate or move relative to the mounting device 200. As discussed previously, rotation of the mount 152 in the receptacle may allow a differential pressure set point to be adjusted.

According to the embodiment of FIG. 8 and as discussed previously with reference to FIG. 6, the threshold differential pressure corresponding to the movement of a movable element 10 within a conduit portion 156 may be based on the adjusted inclination of the conduit portion relative to a horizontal plane. A user may select a particular inclination of the conduit portion 156 depending on the desired threshold differential pressure. The pitch indicator 218 and the roll indicator 220 may be employed to ensure the base 202 is aligned in the desired reference plane (e.g., aligned with a vertical plane) so that the mount 152 has the correspondingly desired reference frame by way of its securement to the receptacle 204. Accordingly, if the base 202 has the desired orientation as indicated by the pitch indicator and the roll indicator, the calibration of differential pressure indication device 150 is known.

As shown in FIG. 8, the conduit portion 156 is fluidically connected to a space on an opposite side of a barrier via a conduit passageway 155 formed through the conduit portion 156 as well as a passageway 206 formed in the receptacle 204. Accordingly, a movable element (see movable element 10 in FIG. 6) may be responsive to a threshold differential pressure between a first space on one side of the barrier and a second space on another side of the barrier, as air and/or pressure may transfer through the passageway 206 and the conduit passageway 155 between the two spaces. In some embodiments as shown in FIG. 8, the conduit portion 156 is received in a collar 154 such that the collar supports the conduit portion. In some other embodiments, the conduit portion 156 may be formed continuously with the collar 154 (e.g., the conduit portion and collar may be formed integrally or may be attached to one another to form a travel path for the movable element), as the present disclosure is not so limited. In some other embodiments, a collar may be omitted, and in some such embodiments a conduit portion may have a translucent and opaque portions. In some embodiments, the differential pressure indication device 150 may include a conduit extending through the passageway 206 of the receptacle. Such an arrangement may reduce or eliminate pressure leakage around the mount 152. In some embodiments, the conduit may rotate with the mount 152 and conduit portion 156. In other embodiments, the conduit extending through the barrier may be rotatably coupled to the mount 152 and/or conduit portion 156, such that the conduit remains stationary while the mount 152 and conduit portion rotates.

As shown in FIG. 8, the pressure indication device 150 may include one or more stops configured to limit the movement of the movable element 10 between a first indication position (e.g., indicative of the presence of a differential pressure between the two spaces) and a second indication position (e.g., indicative of the absence of a differential pressure between the two spaces). In some embodiments as shown in FIG. 8, the collar 154 may include a stop 157, which may engage the movable element 10 to prevent the movable element from moving into the conduit passageway 155 in the second indication position (e.g., in the absence of a differential pressure). In some embodiments, the stop 157 may be formed as a part of the conduit portion 156. In some embodiments, the stop 157 may have an opening configured to be aligned with a center of the movable element 10, such that when the movable element abuts the stop 157, the movable element may close off the conduit passageway 155. Such an arrangement may be beneficial to reduce or eliminate air transfer between the two spaces when a differential pressure is not present.

Figure 9:
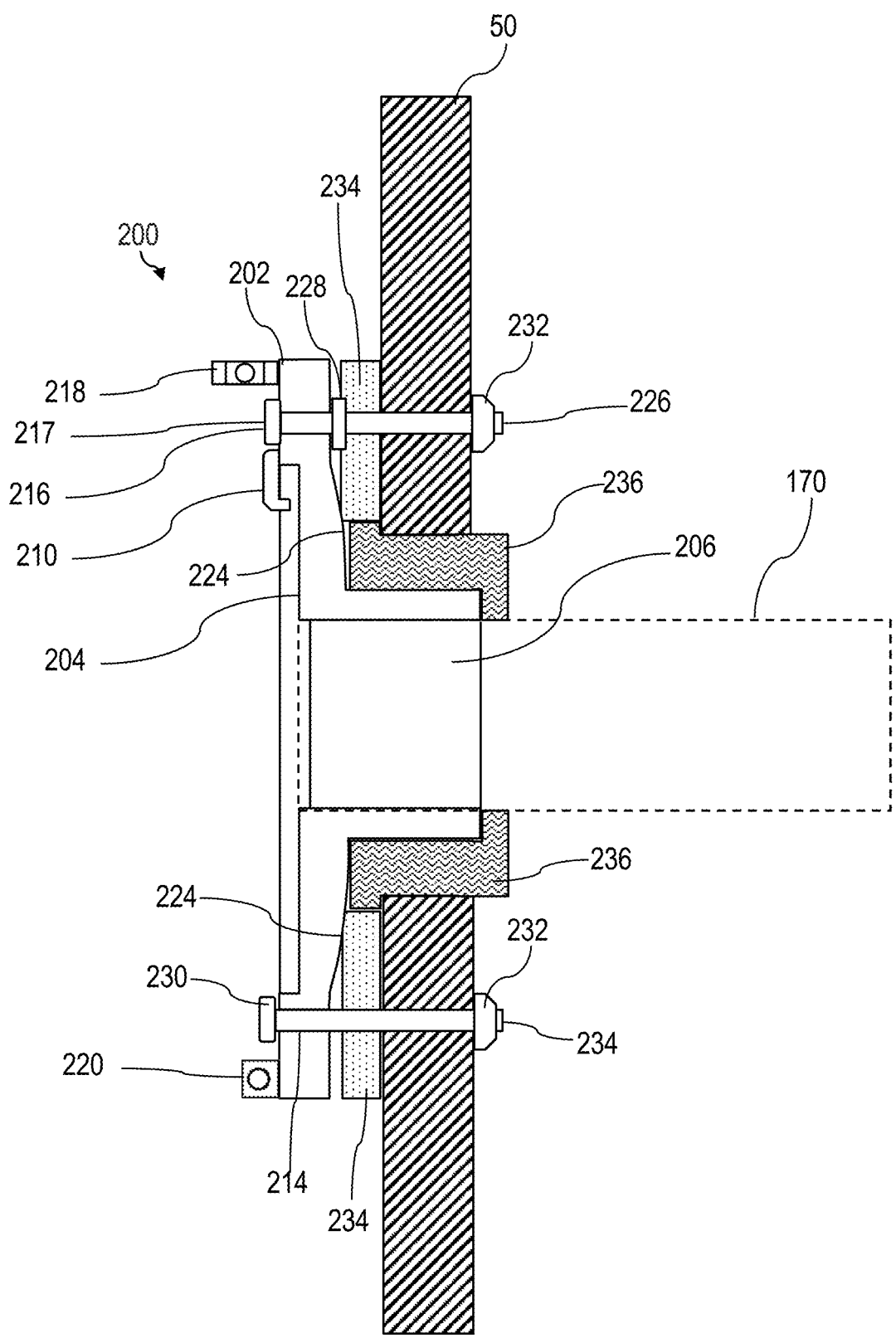
FIG. 9 is a side view of one embodiment of mounting interface between a base and a barrier.

FIG. 9 is a side view of one embodiment of mounting interface between a mounting device 200 and a barrier 50. The mounting device 200 is like that shown in FIG. 3 and includes a base 202 and a receptacle 204 configured to removably retain a differential pressure indication device. As shown in FIG. 9, the pitch adjuster 216 is configured to attach the base 202 to the barrier 50. In the embodiment of FIG. 9, a shaft of the pitch adjuster 216 is attached to an anchor 232 disposed on an opposite side of the barrier 50 from the base 202. As shown in FIG. 9, the clip 228 and head 217 of the pitch adjuster capture the base 202 such that the spacing between the base and the anchor 232 may be adjusted. Based on this adjustment, the pitch of the base will be able to be adjusted to reach a desired orientation with respect to pitch. As shown in FIG. 9, a fastener 230 is disposed in an arc-shaped slot 214 formed in the base. The second fastener includes a shaft secured to another anchor 232. The arc-shaped slot allows the roll orientation of the base to be adjusted. In some embodiments, to mount the base to the barrier 50, the pitch adjuster 216 and the fastener 230 may be loosely attached to the anchors 232. Subsequently, the roll orientation of the base may be adjusted by sliding the fastener 230 within the arc-shaped slot until the roll orientation is correct as verified by the roll indicator 220. When a desired roll orientation is reached, the fastener 230 may be tightened to fix the roll orientation. With the roll orientation fixed, the pitch of the base 202 may be adjusted by rotating the pitch adjuster 216 to adjust the spacing between the barrier 50 and the portion of the base 202 adjacent the pitch adjuster. The pitch may be adjusted in this manner until correct as verified by the pitch indicator 218. As the pitch is adjusted, the curved surfaces 224 may ensure consistent force transfer between the base 202 and the barrier 50.

As shown in FIG. 9, the mounting device may include a gasket 234. The gasket may be formed of a readily compressible material such as foam, rubber, etc. The gasket may be disposed between a barrier facing surface of the base 202 and the barrier 50. The gasket may be configured to fill a gap between the barrier 50 and the base 202 where the pitch of the base and the barrier differ. For example, if the barrier 50 is not vertical, the pitch of the base may be adjusted so that it is vertical, and the gasket may compensate for a difference in spacing between an upper portion of the base and a lower portion of the base. In some embodiments, the gasket may also provide a resistive spring force against the base to ensure that the orientation of the base is maintained once set. Such a spring force may also allow for even, smoother adjustment of pitch of the base. In some embodiments, the gasket 234 may engaged the curved surfaces 224 of the base. In some embodiments, the gasket may create a pressure seal with the base.

In some embodiments as shown in FIG. 9, the mounting device may include a fireproof or fire-resistant layer 236. The fire-resistant layer 236 may be configured to block or otherwise inhibit travel of the smoke/fire from one space or room to another. The fire-resistant layer of FIG. 9 is arranged as a fire stop ring located on each side of the barrier. The fire-resistant layer may include an intumescent substance that swells significantly as a result of heat exposure. In some cases, the intumescent substance may produce char, which is a substance that acts to retard heat transfer. In some embodiments, the intumescent substance may swell to block the passageway 206. Devices of exemplary embodiments herein may be employed in fire-rated or non-fire-rated applications, as the present disclosure is not so limited.

As shown in FIG. 9, an optional conduit 170 is shown extending through the barrier 50. The conduit 170 may extend through one or more barriers to provide a fluid connection between a first space and a second space. The conduit may be rotatably coupled to a differential pressure indication device in some embodiments. In other embodiments, the conduit may be rigidly coupled to a differential pressure indication device. In some embodiments, the conduit may telescope to adjust to different widths of various barriers. In some embodiments, no conduit may be employed.

Figure 10:
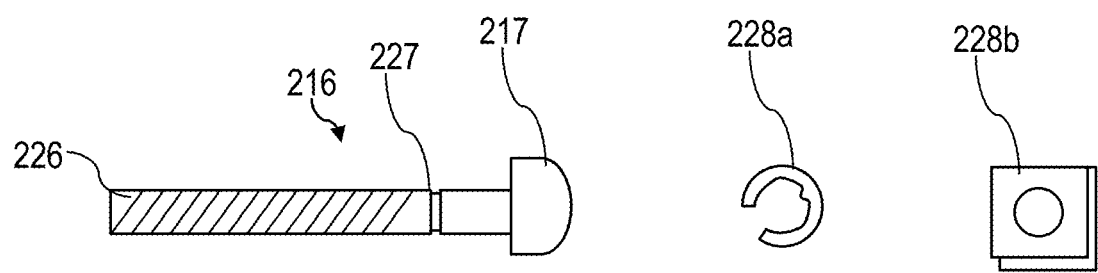
FIG. 10 is a side schematic of one embodiment of a pitch adjuster.

FIG. 10 is a side schematic of one embodiment of a pitch adjuster 216. As shown in FIG. 10, the pitch adjuster includes a head 217 and a shaft 226. The shaft 226 includes a notch 227 or groove. The notch 227 is spaced from the head 217 to accommodate a base between the head and the notch 227. The notch may have a square profile as shown in FIG. 10, a V-shaped profile, or any other suitable shape of profile. The notch is configured to receive a clip 228 which may be used to secure the base between the head and the clip. The spacing between the clip 228 and the head 217 may remain constant. The shaft 226 is threaded and is configured to engage a correspondingly threaded hole or anchor (e.g., associated with a barrier). Accordingly, when the shaft is threaded into or out of a hole or anchor, the spacing between a capture base and the barrier may be adjusted. In some embodiments, a c-clip 228a may be employed, which may snap-fit to the notch 227. In some embodiments, a speed clip 228b may be employed, which may surround the shaft 226 and engage the notch 227. In other embodiments any suitable clip may be employed, as the present disclosure is not so limited. The head 217 may be configured to receive a tool (e.g., a screwdriver) and may have a suitable interface to accommodate transfer of torque from the tool (e.g., hex, torx, phillips head, flathead, etc.). In some embodiments, the head 217 may include a tamper-resistant socket.

It should be noted that while pitch adjusters are shown in exemplary embodiments described herein as part of a mounting device, in some embodiments a pitch adjuster may be included as a part of a differential pressure indication device, as the present disclosure is not so limited. For example, a mount of a differential pressure indication device may be configured to be mounted directly to a barrier. In some such embodiments, the pitch adjuster may be employed to adjust a pitch of the mount to provide a desired orientation of the mount with respect to pitch. Two such exemplary embodiments are discussed further below with reference to FIGS. 13-14. In some such embodiments, the mount may include a pitch indicator and a roll indicator similar to the embodiment of FIGS. 3-4. In some embodiments, the base of the embodiments of FIGS. 3-4 may be integrated with a differential pressure indication device, such that the base is integral or permanently fastened with the mount.

Figure 11:
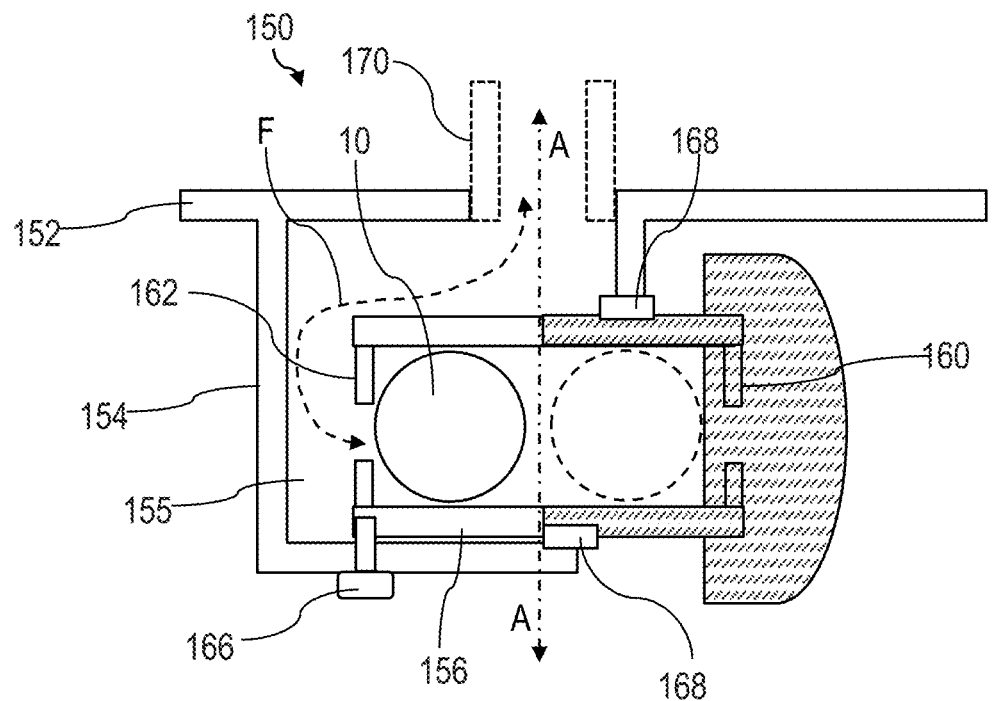
FIG. 11 is a top schematic of another embodiment of a device for indicating a presence of a directional differential pressure between a first space and a second space.

FIG. 11 is a top schematic of another embodiment of a device 150 for indicating a presence of a directional differential pressure between a first space and a second space. The device of FIG. 11 includes a mount 152 that is configured to be received in a receptacle of a mounting device. A collar 154 extends from the mount which provides a conduit passageway 155. A flow path F for air or another fluid through the device is shown in FIG. 11. The collar 154 supports a conduit portion 156. According to the embodiment of FIG. 11, the conduit portion 156 is secured to the collar with a conduit fastener 166. The conduit fastener may be a screw, tack, or another suitable fastener. In some embodiments, the conduit portion 156 may be secured to the collar with adhesive or press-fit. In some embodiments, a conduit gasket 168 is disposed between the collar 154 and the conduit portion 156 which forms a pressure seal. In some embodiments, the gasket may be an O-ring. As shown in FIG. 11, an optional conduit 170 may extend from the mount 152 through a passageway of a mounting device and/or a barrier to form a fluid connection to another space. The conduit may be rigidly mounted to the mount in some embodiments. In some embodiments, the conduit may be rotatably coupled to the mount.

According to the embodiment of FIG. 11, the device 150 is configured such that the movable element 10 is positioned entirely to a first side of a center axis A when the movable element is contacting a first, distal stop 160 (the movable element is shown in dashed lines in this position). In some embodiments, the center axis A may be an axis of rotation of the mount 152. When the movable element 10 is contacting a second, proximal stop 162, the movable element is shown as entirely on a second side of the axis A, opposite from the first side. When discussing proximal and distal movable element stops, the terms proximal and distal are used in a relative sense. A proximal movable element does not necessarily mean that the proximal movable element is at an end of a conduit portion, and likewise, a distal movable element does not necessarily mean that the distal movable element is at an end of a conduit portion. Generally, the term proximal is used herein for a component which is configured to be closer to the barrier opening along a fluid connection path or air flow path when the device is mounted, as compared to a more distal component which is configured to be farther from the barrier opening along a fluid connection path or air flow path when the device is mounted.

Figure 12:
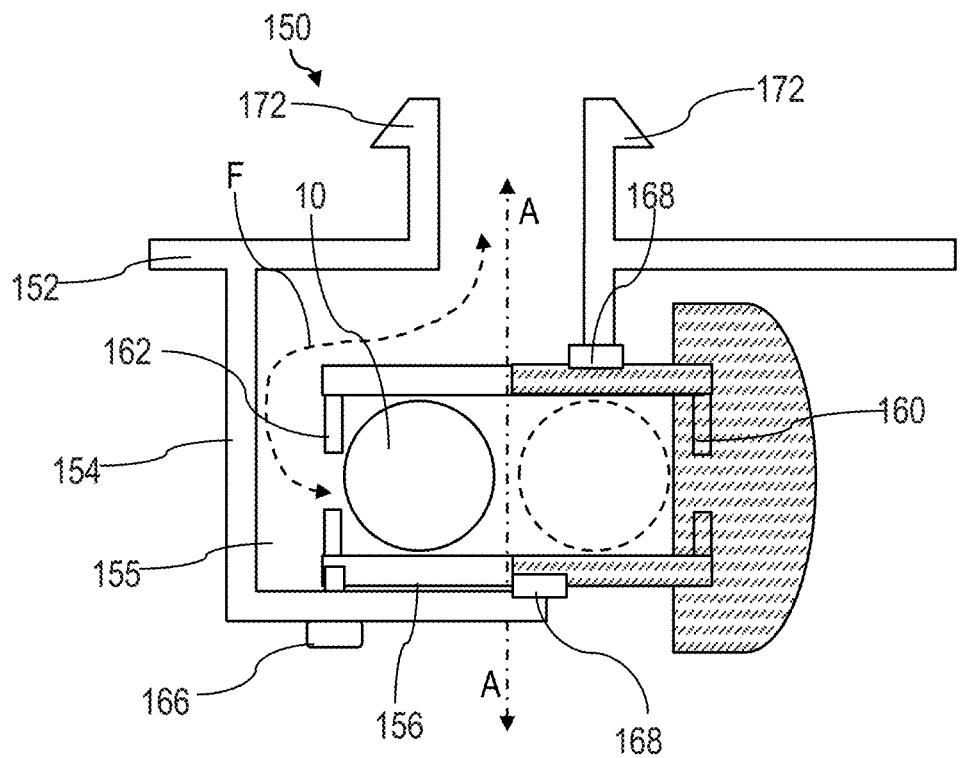
FIG. 12 is a top schematic of another embodiment of a device for indicating a presence of a directional differential pressure between a first space and a second space.

FIG. 12 is a top schematic of another embodiment of a device 150 for indicating a presence of a directional differential pressure between a first space and a second space. The device of FIG. 12 includes a mount 152 that is configured to be received in a receptacle of a mounting device. A collar 154 extends from the mount which provides a conduit passageway 155. A flow path F for air or another fluid through the device is shown in FIG. 12. The collar 154 supports a conduit portion 156. According to the embodiment of FIG. 12, the conduit portion 156 is secured to the collar with a conduit fastener 166. The conduit fastener may be a screw, tack, or another suitable fastener. In some embodiments, the conduit portion 156 may be secured to the collar with adhesive or press-fit. In some embodiments, a conduit gasket 168 is disposed between the collar 154 and the conduit portion 156 which forms a pressure seal. In some embodiments, the gasket may be an O-ring.

According to the embodiment of FIG. 12, the device 150 includes snap-fit connectors 172 for attachment to a receptacle of a mounting device. The snap-fit connectors may be an alternative to other mounting fasteners described herein or may be used in addition to other mounting fasteners. A receptacle of a mounting device may include notches configured to receive the snap-fit connectors 172 such that mount 152 is attachable in the receptacle in a discrete number of orientations. In some embodiments, the snap-fit connectors 172 and the receptacle may be arranged such that the mount 152 can be attached to the receptacle in only one orientation. The interaction between the snap-fit connectors and the notches may prevent rotation of the mount once the mount is attached to the receptacle. In some embodiments, the snap-fit connectors 172 may act as locators to orient the mount 152 in a desired roll orientation relative to a mounting device. The associated notches in a receptacle may serve as complementary locators on the base of the mounting device to receive the locators which are positioned on the mount 152. Other locators may also be used. In this manner, tampering or accidental movement of the device 150 may be inhibited. In other embodiments, the snap-fit connectors 172 may allow the mount to rotate within a receptacle, as the present disclosure is not so limited. In some embodiments, a user may squeeze snap-fit connectors 172 toward one another to release the mount 152 from a mounting device receptacle. Such an arrangement may permit installation and/or removal of the mount without the use of a tool. In some embodiments, a tool may be used to attach and/or detach the mount to a baseplate.

Figure 13:
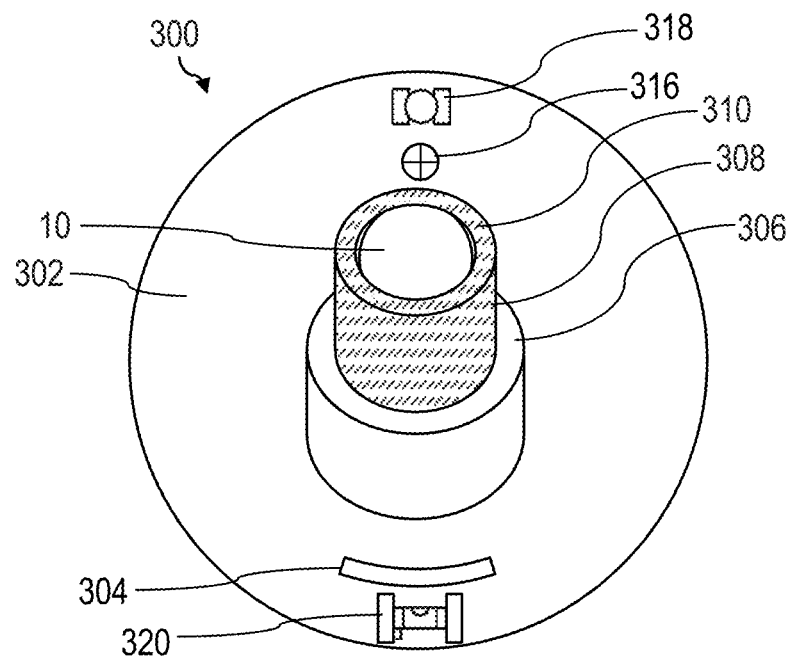
FIG. 13 is a front view of another embodiment of a device for indicating a presence of a directional differential pressure between a first space and a second space.

FIG. 13 is a front view of another embodiment of a device 300 for indicating a presence of a directional differential pressure between a first space and a second space. As shown in FIG. 13, the device includes a mount 302. According to the embodiment of FIG. 13, the mount 302 is configured to be directly mounted against a barrier (e.g., without any separate mounting device). The mount 302 may therefore function as a base for the device 300. In some embodiments, the mount may be configured as a flange. The mount includes an arc-shaped slot 304. The arc-shaped slot is configured to receive a fastener (e.g., a screw) that may be employed to secure the device to a barrier. For example, the fastener may thread into a barrier or an anchor of a barrier. The arc-shaped slot may allow a roll angle of the mount 302 to be adjusted while a fastener is received in the arc-shaped slot. For example, if a fastener is not tightened, the fastener may slide along the arc-shaped slot as the mount 302 is adjusted in a roll direction (e.g., rotation about an axis perpendicular to a plane of the mount 302). Such an arrangement may allow the orientation of the mount 302 to be set correctly during installation. In some other embodiments, no arc-shaped slot 304 may be employed, and a hole may be employed instead. In such an arrangement, an installer may ensure that corresponding holes or anchors in a barrier are vertically aligned to ensure the orientation of the mount 302 with respect to roll is correct when mounted to the barrier.

According to the embodiment of FIG. 13, the device 300 includes a pitch adjuster 316. The pitch adjuster 316 is configured as a fastener configured to couple the mount 302 to a barrier. In some embodiments, the pitch adjuster may be configured as a screw or bolt configured to be rotated to secure the mount to a barrier, for example as shown in FIG. 10. The pitch adjuster is also configured to adjust a spacing between a portion of the mount 302 and a barrier via rotation of the pitch adjuster. According to the embodiment of FIG. 13, installation of the device 300 on a barrier may include first adjusting the roll orientation of the mount by rotating the mount about the pitch adjuster 316. The arc-shaped slot 304 allows the roll orientation of the mount to be adjusted.

In some embodiments, the pitch adjuster 316 and a fastener in the arc-shaped slot 304 may be loosely attached to anchors or holes in a barrier. Subsequently, the roll orientation of the mount may be adjusted by sliding the fastener within the arc-shaped slot until the roll orientation is correct (e.g., as verified by a roll indicator 320). When a desired roll orientation is reached, the fastener in the arc-shaped slot may be tightened to fix the roll orientation of the mount 302. With the roll orientation fixed, the pitch of the mount 302 may be adjusted by rotating the pitch adjuster 316 to adjust the spacing between the barrier and the portion of the mount 302 adjacent the pitch adjuster. In some embodiments, similar to previously described embodiments, the mount 302 may include curved surfaces facing a barrier configured to retain consistent engagement between the mount and the barrier as the pitch of the mount is adjusted. In some embodiments, the device 300 may include a compressible gasket disposed between the mount 302 and a barrier. The gasket may be configured to compress when a pitch of the mount is adjusted with the pitch adjuster 316 to compensate for differences or changes in spacing between the mount and the barrier.

According to the embodiment of FIG. 13, the pitch adjuster 316 may be disposed in a hole formed in the mount 302. In some other embodiments, the pitch adjuster may be disposed in an arc-shaped slot. According to such embodiments, the pitch adjuster may slide within the first arc-shaped slot to allow a roll angle of the mount 302 to be adjusted. In some embodiments, the roll angle of the mount 302 may be adjustable about a central rotation axis that is perpendicular to a plane of the mount 302. In some embodiments, the central rotation axis may be transverse or perpendicular to a barrier. An example of a pitch adjuster disposed in an arc-shaped slot is discussed further with reference to the exemplary embodiment of FIG. 14.

According to the embodiment of FIG. 13, the mounting device includes a pitch indicator 318 and a roll indicator 320. The pitch indicator 318 is configured to indicate a pitch angle of the mount 302 to a user or installer. In some embodiments, the pitch indicator may be configured to indicate alignment of the mount in a desired orientation with respect to pitch. For example, the pitch indicator may indicate alignment of the mount 302 with a vertical plane. The pitch indicator may be responsive to gravity. In some embodiments, the pitch indicator may include a movable marker (e.g., air bubble, weighted ball, etc.) responsive to gravity. In some embodiments, the pitch indicator is a bubble level. The roll indicator 320 is configured to indicate a roll angle of the mount 302 to a user or installer. In some embodiments, the roll indicator may be configured to indicate alignment of the mount in a desired orientation with respect to roll. The roll indicator may be responsive to gravity. In some embodiments, the roll indicator may include a movable marker (e.g., air bubble, weighted ball, etc.) responsive to gravity. In some embodiments, the roll indicator is a bubble level. While separate pitch and roll indicators are shown in FIG. 13, in other embodiments a single multi-axis indicator may be employed, as the present disclosure is not so limited. For example, a two-axis bubble level may be employed to indicate both a roll and a pitch of the mount 302. Indication from the pitch indicator and the roll indicator as to the pitch and roll, respectively, may be employed to ensure that a differential pressure indication device 300 is responsive to a correct threshold differential pressure.

As shown in FIG. 13, the device 300 includes a conduit portion 308 that is configured to be fluidically connected to the first space and the second space. Accordingly, a movable element 10 disposed in the conduit may move in response to a threshold differential pressure between the first space and the second space. In particular, the movable element may move between a first end and a second end of the conduit portion 308. In the embodiment of FIG. 13, the movable element is configured as a ball, though any suitable movable element may be employed, as the present disclosure is not so limited. In the embodiment of FIG. 13, the conduit portion 308 is fixed relative to the mount 302. The conduit portion 308 is inclined relative to the mount 302, such that when the mount is aligned with a vertical plane, the conduit portion 308 is inclined relative to a horizontal plane. Accordingly, the conduit portion may not move (e.g., rotate) relative to the mount. In some embodiments as shown in FIG. 13, the device 300 includes a collar 306 configured to support the conduit portion 308. In some embodiments as shown in FIG. 13, the collar may be opaque and configured to hide the movable element 10 when a threshold differential pressure is not present. In contrast, the conduit portion 308 is translucent or transparent, such that the movable element 10 is visible when the threshold differential pressure is present. In some embodiments, the collar may be translucent or transparent and the conduit portion 308 may be opaque. In some embodiments, visibility of the ball may indicate a threshold differential pressure is not present, whereas invisibility of the ball (e.g., when the ball is disposed in the collar 306) may indicate the threshold differential pressure is present. In some embodiments, the conduit portion includes a stop 310 configured to retain the movable element 10 within the conduit portion.

In the embodiment of FIG. 13, the conduit portion is inclined upward relative to a horizontal plane. In some cases, the device 300 may be inverted, such that the conduit portion is declined downward relative to a horizontal plane. For example, rotating the mount 302 clockwise or counterclockwise 180 degrees relative to the page (e.g., about an axis perpendicular to a plane of the mount 302) may invert the inclination of the conduit portion 308. Accordingly, the device 300 of FIG. 13 may be invertible depending on the direction of the differential pressure between a first space and a second space. In some embodiments, holes or anchors on a barrier may accommodate either the pitch adjuster 316 or a fastener received in the arc-shaped slot 304, such that the device 300 may be oriented in either orientation when installed.

Figure 14:
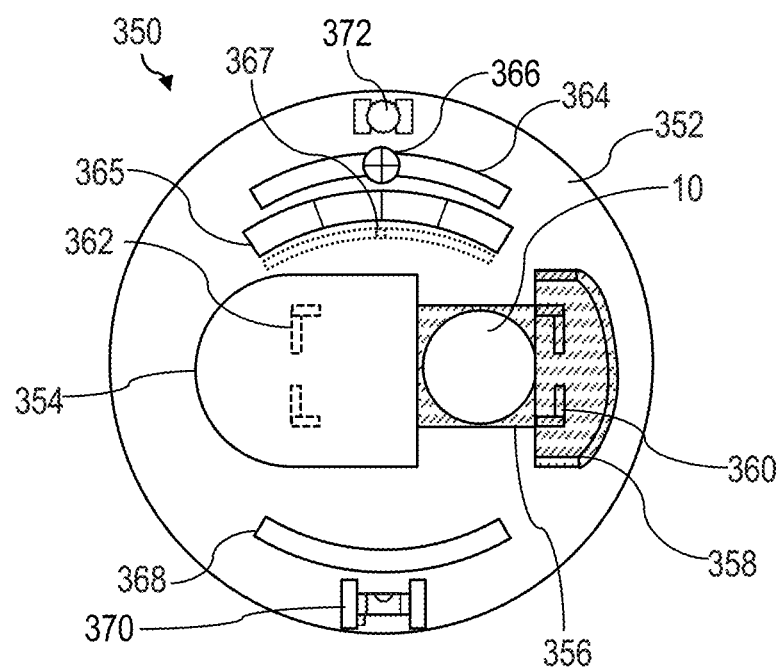
FIG. 14 is a front view of another embodiment of a device for indicating a presence of a directional differential pressure between a first space and a second space.

FIG. 14 is a front view of another embodiment of a device 350 for indicating a presence of a directional differential pressure between a first space and a second space. As shown in FIG. 14, the device includes a mount 352. According to the embodiment of FIG. 14, the mount 352 is configured to be directly mounted against a barrier (e.g., without any separate mounting device). The mount 352 may therefore function as a base for the device 350. In some embodiments, the mount may be configured as a flange. As shown in FIG. 14, the mount includes a first arc-shaped slot 364 and a second arc-shaped slot 368. The arc-shaped slots are each configured to receive a fastener (e.g., a screw, pitch adjuster, etc.) that may be employed to secure the device to a barrier. For example, the fastener may thread into a barrier or an anchor of a barrier. The arc-shaped slots may allow a roll angle of the mount 352 to be adjusted while fasteners are received in the arc-shaped slots. For example, if the fasteners are not tightened, the fasteners may slide along the arc-shaped slots as the mount 352 is adjusted in a roll direction (e.g., rotation about an axis perpendicular to a plane of the mount 352). Such an arrangement may allow the orientation of the mount 352 to be set correctly during installation. As the arrangement of FIG. 14 includes two arc-shaped slots the roll angle of the mount 352 may be adjusted about a central axis of rotation with a range established by the two arc shaped slots. (e.g., perpendicular to a plane of the mount 352 and/or transverse or perpendicular to a barrier). In the embodiment of FIG. 14, the roll angle may be adjusted approximately ±30 degrees from a home position (e.g., zero roll angle) shown in FIG. 14. In other embodiments other sizes of arc-shaped slots allowing for a lesser or greater range of roll angle adjustment may be employed, as the present disclosure is not so limited.

It should be noted that while arc-shaped slots are employed in the embodiment of FIG. 14, any mounting arrangement allowing adjustment of a roll angle of a mount may be employed in other embodiments. For example, in some embodiments a plurality of discrete angular adjustment holes may be formed in the mount 352 which allow the roll angle to be adjusted in discrete increments.

According to the embodiment of FIG. 14, the device 350 includes a pitch adjuster 366. The pitch adjuster 366 is configured as a fastener configured to couple the mount 352 to a barrier. In some embodiments, the pitch adjuster may be configured as a screw or bolt configured to be rotated to secure the mount to a barrier, for example as shown in FIG. 10. The pitch adjuster is also configured to adjust a spacing between a portion of the mount 352 and a barrier via rotation of the pitch adjuster. As shown in FIG. 14, the pitch adjuster 366 is disposed in the first arc-shaped slot 364. Accordingly, the pitch adjuster may slide within the first arc-shaped slot to allow a roll angle of the mount 352 to be adjusted as discussed above. According to the embodiment of FIG. 14, installation of the device 350 on a barrier may include first adjusting the roll orientation of the mount by rotating the mount about the pitch adjuster 316. The arc-shaped slots 364, 368 allow the roll orientation of the mount 352 to be adjusted. In some embodiments, the pitch adjuster 366 and a fastener in the second arc-shaped slot 368 may be loosely attached to anchors or holes in a barrier. Subsequently, the roll orientation of the mount may be adjusted by sliding the fastener and the pitch adjuster 366 within the arc-shaped slots until the roll orientation is correct (e.g., as verified by a roll indicator 370). When a desired roll orientation is reached, the fastener in the second arc-shaped slot 368 may be tightened to fix the roll orientation of the mount 352. With the roll orientation fixed, the pitch of the mount 352 may be adjusted by rotating the pitch adjuster 316 to adjust the spacing between the barrier and the portion of the mount 352 adjacent the pitch adjuster. In some embodiments, similar to previously described embodiments, the mount 352 may include curved surfaces facing a barrier configured to retain consistent engagement between the mount and the barrier as the pitch of the mount is adjusted (for example, see curved surfaces 224 in FIG. 9). In some embodiments, the device 350 may include a compressible gasket disposed between the mount 352 and a barrier (for example, see curved surfaces 224 in FIG. 9). The gasket may be configured to compress when a pitch of the mount is adjusted with the pitch adjuster 316 to compensate for differences or changes in spacing between the mount and the barrier.

According to the embodiment of FIG. 14, the mounting device includes a pitch indicator 372 and a roll indicator 370. The pitch indicator 372 is configured to indicate a pitch angle of the mount 352 to a user or installer. In some embodiments, the pitch indicator may be configured to indicate alignment of the mount in a desired orientation with respect to pitch. For example, the pitch indicator may indicate alignment of the mount 352 with a vertical plane. The pitch indicator may be responsive to gravity. In some embodiments, the pitch indicator may include a movable marker (e.g., air bubble, weighted ball, etc.) responsive to gravity. In some embodiments, the pitch indicator is a bubble level. The roll indicator 370 is configured to indicate a roll angle of the mount 352 to a user or installer. In some embodiments, the roll indicator may be configured to indicate alignment of the mount in a desired orientation with respect to roll. The roll indicator may be responsive to gravity. In some embodiments, the roll indicator may include a movable marker (e.g., air bubble, weighted ball, etc.) responsive to gravity. In some embodiments, the roll indicator is a bubble level. While separate pitch and roll indicators are shown in FIG. 14, in other embodiments a single multi-axis indicator may be employed, as the present disclosure is not so limited. For example, a two-axis bubble level may be employed to indicate both a roll and a pitch of the mount 352. Indication from the pitch indicator and the roll indicator as to the pitch and roll, respectively, may be employed to ensure that a differential pressure indication device 350 is appropriately calibrated such that a differential pressure set point is ensured to be correct.

As shown in FIG. 14, the device includes a conduit portion 356 that is configured to be fluidically connected to the first space and the second space. Accordingly, a movable element 10 disposed in the conduit may move in response to a threshold differential pressure between the first space and the second space. In particular, the movable element may move between a first stop 360 and a second stop 362 of the conduit portion 356. In the embodiment of FIG. 14, the movable element 10 is configured as a ball, though any suitable movable element may be employed in other embodiments, as the present disclosure is not so limited. In the embodiment of FIG. 14, the conduit portion 356 is fixed relative to the mount 352. Accordingly, rotation of the mount 352 may adjust the inclination of the conduit portion 356. In the embodiment of FIG. 14, the longitudinal axis of the conduit portion extends parallel to a plane of the mount 352. Accordingly, rotation about the rotation axis perpendicular to the plane of the mount 352 adjusts the inclination of the conduit portion. The roll angle of the mount 352 may correspond to a threshold differential pressure set point. In some embodiments as shown in FIG. 14, the device 350 includes a collar 354 configured to support the conduit portion 356. In some embodiments as shown in FIG. 14, the collar may be opaque and configured to hide the movable element 10 when a threshold differential pressure is not present. In contrast, the conduit portion 356 is translucent or transparent, such that the movable element 10 is visible when the threshold differential pressure is present. In some embodiments, the collar may be translucent or transparent and the conduit portion 356 may be opaque. In some embodiments, visibility of the ball may indicate a threshold differential pressure is not present, whereas invisibility of the ball (e.g., when the ball is disposed in the collar 354) may indicate the threshold differential pressure is present. In some embodiments, the conduit portion includes a dome 358 which may be configured to provide a fluidic connection to the conduit portion to a first space. In some embodiments, the dome may be translucent or transparent, such that the movable element 10 is visible through the dome. In some embodiments no dome may be employed, as the present disclosure is not so limited.

In some embodiments as shown in FIG. 14, the mount 352 includes a plurality of markings 365. The plurality of markings may be indicative of an inclination of the conduit portion 356, where the inclination of the conduit portion corresponds to a threshold differential pressure set point. In the depicted embodiment, the pitch adjuster points to one of the plurality of markings 365 to indicate the specific threshold differential pressure set point. In some embodiments, the plurality of markings may be disposed adjacent the second arc-shaped slot 368, such that a fastener disposed in that slot points to one of the plurality of markings. The plurality of markings may be calibrated based on a desired reference frame to provide an indication to an installer or user as to the current threshold differential pressure. In particular, the plurality of markings may be zeroed by referring to the roll indicator 370 when the mount 352 is at zero roll angle. In some embodiments, the mount 352 may include an optional movable marker 367 (e.g., an air bubble, weighted ball, etc.) that is configured to move as the mount 352 is rotated in a roll direction. The movable marker may point to one of the plurality of markings 365 to indicate the threshold differential pressure set point. Such an arrangement may be accurate regardless of the accuracy or position of the pitch adjuster 366 or other fastener in the second arc-shaped slot 368. In some embodiments, the plurality of markings 365 may not be accurate if the mount 352 is not vertically disposed (e.g., aligned in a vertical plane), which may be verified by the pitch indicator 372.

Figure 15:
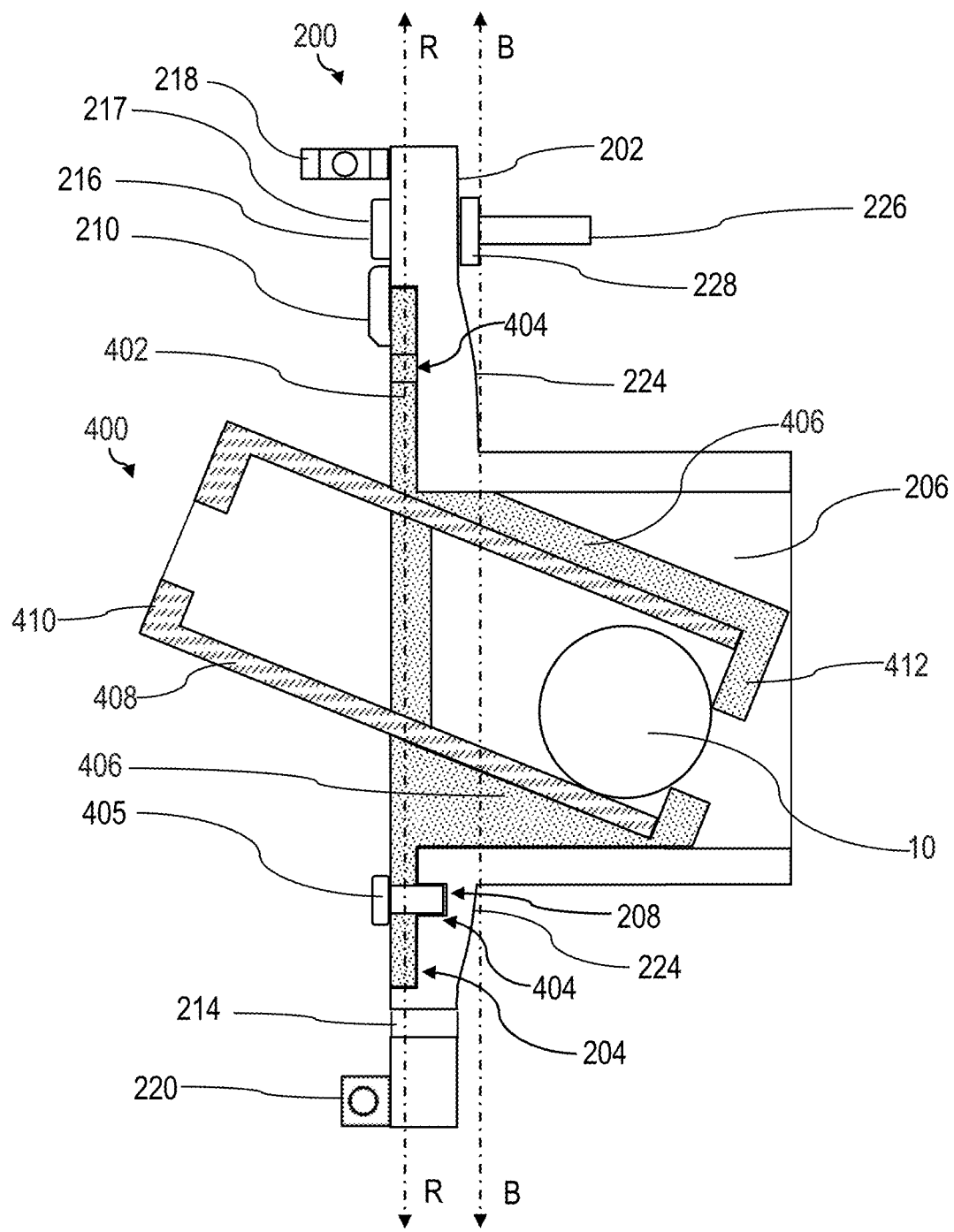
FIG. 15 is a side schematic of an embodiment of a system including a mounting device and a device for indicating a presence of a directional differential pressure between a first space and a second space.

FIG. 15 is a side schematic of another embodiment of a system including a mounting device 200 and a device 400 for indicating a differential pressure between two spaces. As shown in FIG. 15, the mounting device 200 may be similar to that described with reference to FIG. 4. As shown in FIG. 15, the mounting device 200 includes a base 202 and a receptacle 204 formed in the base. The receptacle may be a depression formed in the base. As shown in FIG. 15, a passageway 206 extends from the base and connects to the receptacle 204. The passageway 206 allows air and/pressure to transfer from an opposing side of the barrier to the device 400. In some embodiments, the passageway and the base may be integrally molded. In other embodiments the passageway may be separate from the base, as the present disclosure is not so limited. The passageway 206 may extend partially or entirely through a barrier.

According to the embodiment of FIG. 15, the mounting device 200 includes a pitch indicator 218 and a roll indicator 220. The pitch indicator 218 is configured to indicate a pitch angle of the base 202 to a user. In some embodiments, the pitch indicator may be configured to indicate alignment of the base in a desired orientation with respect to pitch. For example, the pitch indicator may indicate alignment of the base 202 with a vertical plane and/or alignment of passageway 206 with a horizontal plane. The pitch indicator may be responsive to gravity. In some embodiments, the pitch indicator may include a movable marker (e.g., air bubble, weighted ball, etc.) responsive to gravity. In some embodiments, the pitch indicator is a bubble level. The roll indicator 220 is configured to indicate a roll angle of the base 202 to a user. In some embodiments, the roll indicator may be configured to indicate alignment of the base in a desired orientation with respect to roll. The roll indicator may be responsive to gravity. In some embodiments, the roll indicator may include a movable marker (e.g., air bubble, weighted ball, etc.) responsive to gravity. In some embodiments, the roll indicator is a bubble level. While separate pitch and roll indicators are shown in FIG. 15, in other embodiments a single multi-axis indicator may be employed, as the present disclosure is not so limited. For example, a two-axis bubble level may be employed to indicate both a roll and a pitch of the base 202. Indication from the pitch indicator and the roll indicator as to the pitch and roll, respectively, may be employed to ensure that a differential pressure indication device supported by the mounting device is responsive to a correct threshold differential pressure. In the case of an adjustable differential pressure indication device supported by the barrier, the pitch and roll indicators may ensure that the adjustments of the differential pressure indication device are calibrated and accurate.

According to the embodiment of FIG. 15 and as discussed with reference to previous embodiments, the base 202 includes a curved surface 224. The curved surface 224 faces a barrier and may function as a barrier-contacting surface in some embodiments. In some embodiments, forces securing the base to the barrier may be transferred through the curved surface. The curved surface is convex such that as pitch of the base 202 is adjusted with respect to a barrier, the curved surface may maintain consistent engagement with a barrier. Such an arrangement may be beneficial to ensure that the base is sealed against a barrier. Such an arrangement may also be beneficial to ensure that the pitch of the base may be smoothly adjusted with a pitch adjuster 216. In some embodiments, the curved surface may cooperate with a gasket to provide a mounting interface for the base to a barrier. In other embodiments, a base may not include a curved surface, as the present disclosure is not so limited.

According to the embodiment of FIG. 15 and similar to previously discussed embodiments, the pitch adjuster 216 is configured as a screw including a head 217 and a shaft 226. The pitch adjuster also includes a clip 228 disposed on the shaft 226. The head 217 is disposed on one side of the base 202, and the clip 228 is disposed on a second, opposing side of the base 202. Accordingly, the base is captured between the head 217 and the clip 228. Rotation of the pitch adjuster may thread the shaft 226 into or out of a corresponding hole or anchor associated with a barrier. This movement of the pitcher adjuster will therefore adjust a spacing between the base 202 and the barrier at the portion surrounding the pitch adjuster. In this manner, the pitch adjuster may be used to adjust the pitch of the base independently from an attached barrier. Accordingly, if the barrier is not plumb (e.g., vertically disposed), the pitch adjuster may be employed to ensure the base 202 is plumb (e.g., vertically disposed) or in another desired orientation with respect to pitch independent of the barrier. The pitch adjuster is configured such that the pitch may be adjusted at the same time that the base is mounted to a barrier with the shaft 226. Of course, while a specific pitch adjuster configured as a screw is shown in FIG. 15, any pitch adjuster arrangement may be employed such as slidable shims that do not rotate to adjust the pitch of the base, as the present disclosure is not so limited.

According to the embodiment of FIG. 15, the mounting device 200 includes a tab 210. The tab 210 is configured to cover a portion of the receptacle 204 to secure a mount 402 of the differential pressure indication device 400 in the receptacle. The tab 210 may allow the differential pressure indication device to be movably secured in the receptacle 204, so that the differential pressure indication device may rotate relative to the mounting device. Additionally, the mounting device may include one or more device mounting holes 208 formed in the receptacle 204 that are configured to receive mounting fasteners 405 of the differential pressure indication device 400. In some embodiments, when a differential pressure indication device 400 receives a fastener through a mount hole 404 and into the mounting hole 208, the device 400 may be fixed to the mounting device such that the mounting device may not rotate relative to the mounting device.

According to the embodiment of FIG. 15, the differential pressure indication device 400 may be configured to be interchangeable with the devices described previously with reference to FIGS. 1-2. Similar to the embodiment of FIG. 1, the device of FIG. 15 is configured to provide a fixed threshold differential pressure set point. As shown in FIG. 15, the device includes a mount 402. The mount may be cylindrical and is configured to be received in the receptacle 204. In some embodiments, the mount and the receptacle may be disk-shaped. In some embodiments, the mount may be configured as a flange. The mount may include one or more device mount holes 404 configured to receive fasteners 405 allowing the mount to be fixed to the mounting device 200.

As shown in FIG. 15, the device 400 includes a conduit portion 408 that is configured to be fluidically connected to the first space and the second space (e.g., via the passageway 206). A movable element 10 disposed in the conduit portion may move in response to a threshold differential pressure between the first space and the second space. In particular, the movable element may move between a first end and a second end of the conduit portion 408. In the embodiment of FIG. 15, the movable element 10 is configured as a ball, though any suitable movable element may be employed, as the present disclosure is not so limited. In the embodiment of FIG. 15, the conduit portion 408 is fixed relative to the mount 402. The conduit portion 408 is inclined relative to the mount 402, such that when the mount is aligned with a vertical plane, the conduit portion 408 is inclined relative to a horizontal plane. Accordingly, the conduit portion may not move (e.g., rotate) relative to the mount. In some embodiments, the movable element 10 may be concealed within a barrier when indicating an absence or presence of a threshold differential pressure. The conduit portion 408 is translucent or transparent, such that the movable element 10 may be visible when the movable element is disposed at a first stop 410 of the conduit portion 408 (e.g., when the threshold differential pressure is present). In some embodiments the stop 410 may be formed integrally with the conduit portion 408. In some embodiments, the stop 410 may be attached to the conduit portion separately In some embodiments as shown in FIG. 15, the conduit portion 408 is received in a collar 406 such that the collar supports the conduit portion. In some other embodiments, the conduit portion 408 may be formed continuously with a collar 406 (e.g., the conduit portion and collar may be formed integrally or may be attached to one another to form a travel path for the movable element), as the present disclosure is not so limited. In some other embodiments, a collar may be omitted, and in some such embodiments a conduit portion may have a translucent and opaque portions. As shown in FIG. 15, the collar 406 may be opaque to assist in concealing the movable element 10 (e.g., within a barrier). As shown in FIG. 15, the mount 402 may also be opaque to further conceal the movable element when the movable element is disposed at a second stop 412 opposite the first stop 410. The second stop 412 is formed as a part of the collar 406. The movable element 10 may be disposed at the second stop 412 in the absence of a threshold differential pressure between the two spaces. In some embodiments, visibility of the movable element 10 may indicate a threshold differential pressure is not present, whereas invisibility of the ball (e.g., when the ball is disposed in the collar 406) may indicate the threshold differential pressure is not present. The first stop 410 and the second stop 412 may retain the movable element within the conduit portion 408. In some embodiments, the second stop 412 may be formed as a part of the conduit portion 108. In some embodiments, the second stop 412 may have an opening configured to be aligned with a center of the movable element 10, such that when the movable element abuts the second stop 412, the movable element may close off the passageway 206. In some embodiments, the second stop 412 may be formed as a part of the conduit portion 408.

The inventor has appreciated that in some circumstances it may be desirable to reduce an amount of a threshold differential pressure indicator protrudes from a barrier. For example, in a high traffic hallway, it may be desirable to limit the space occupied by the threshold differential pressure indicator. Accordingly, in some embodiments as shown in FIG. 15, a conduit portion 408 may protrude into a passageway 206 of a mounting device 200. That is, the conduit portion 408 may protrude past a receptacle plane R that is aligned with the receptacle 204 and is received by the passageway 206, so that the overall length of the conduit protruding past the receptacle plane R is reduced. For example, in contrast to the arrangement of FIG. 7, the amount of protrusion past the receptacle plane R in the arrangement of FIG. 15 may be approximately half that shown in FIG. 7. In some embodiments, the receptacle plane R may bisect a conduit portion 408. For example, the receptacle plane R may separate a first, vertically higher region of the conduit portion 408 from a second, vertically lower region of the conduit portion. In some embodiments, the movable element 10 may move in the conduit portion 408 between a first indication position (e.g., indicative of the presence of a differential pressure between the two spaces) and a second indication position (e.g., indicative of the absence of a differential pressure between the two spaces). In some embodiments, the movable element may be on one side of the receptacle plane R in the first indication position, and on a second opposite side of the receptacle plane R in the second indication position. For example, as shown in FIG. 15, the movable element 10 is disposed completely to the right of the receptacle plane R relative to the page. In some embodiments, a majority of a movable element 10 may be disposed on one side of the receptacle plane R in the first indication position, and a majority of the movable element may be disposed on a second opposite side of the receptacle plane R in the second indication position. In such an embodiments, the movable element may not fully cross the receptacle plane R. A device 400 like that shown in FIG. 15 may be interchangeable in the receptacle 204 with the devices of exemplary FIGS. 1 and 2.

In some embodiments as shown in FIG. 15, a conduit portion 408 may protrude into barrier, represented by a barrier plane B. That is, the conduit portion 408 may protrude past a barrier plane B that is aligned with a surface of a barrier, so that the overall length of the conduit protruding past the barrier plane B is reduced. In some embodiments, the barrier plane B may bisect a conduit portion 408. For example, the barrier plane B may separate a first, vertically higher region of the conduit portion 408 from a second, vertically lower region of the conduit portion. As noted previously, the movable element 10 may move in the conduit portion 408 between a first indication position (e.g., indicative of the presence of a differential pressure between the two spaces) and a second indication position (e.g., indicative of the absence of a differential pressure between the two spaces). In some embodiments, the movable element may be on one side of the barrier plane B in the first indication position, and on a second opposite side of the barrier plane B in the second indication position. For example, as shown in FIG. 15, the movable element 10 is disposed completely to the right of the barrier plane B relative to the page. In some embodiments, a majority of a movable element 10 may be disposed on one side of the barrier plane B in the first indication position, and a majority of the movable element may be disposed on a second opposite side of the barrier plane B in the second indication position. In such an embodiments, the movable element may not fully cross the barrier plane B.

In the embodiment of FIG. 15, the conduit portion 408 is inclined upward relative to a horizontal plane. In some cases, the device 400 may be inverted, such that the conduit portion 408 is declined downward relative to a horizontal plane. For example, rotating the mount 402 clockwise or counterclockwise 180 degrees about an axis perpendicular to a plane of the mount 402 may invert the inclination of the conduit portion 408. Accordingly, the device 400 of FIG. 1 may be invertible depending on the direction of the differential pressure between a first space and a second space. The holes 404 formed in the mount 402 may be configured to allow the mount 402 to be mounted in either orientation.

According to exemplary embodiments described herein, a conduit portion containing a movable element such as a ball may be parallel to a barrier on which the conduit portion is mounted (for example, see FIGS. 6 and 8). In other embodiments, a conduit portion may be transverse to a barrier on which the conduit portion is mounted (for example, see FIGS. 5, 7, and 15).

According to exemplary embodiments described herein, a mount and a receptacle may be constructed such that the mount is removable from the receptacle without damaging the mount or receptacle. Coupling the mount to a receptacle and removing the mount from the receptacle may be toolless in some embodiments. In other embodiments, one or more tools may be employed.

The pressure difference required to move the ball from a home position (the ball's position when there is no pressure difference between the rooms) can vary based at least on the physical features of the conduit (e.g., passageway diameter, straightness/curvature, surface finish), physical features of the ball (e.g., diameter, weight, surface finish), degree of incline of the conduit, fluid properties of the media between compartments, and the orifice sizes at the stops. In many cases, each of the above parameters is known to a sufficient degree such that threshold directional pressure differences can be linked to the angle of inclination of the conduit portion within which the movable element travels. In some embodiments, balls of different weights may be used to adjust the threshold pressure differences. In some such embodiments, the conduit angle may or may not be adjustable.

As an example, for a hospital isolation room occupied by a patient with an infectious disease that is capable of airborne transmission, it may be desirable to keep the room at a negative differential pressure relative to one or more adjacent rooms, so as to substantially prevent airborne transmission of the disease to an adjacent room. In such an arrangement, the room's ventilation system exhausts more air than is supplied within it to an extent that the negative pressure is of a greater magnitude than any adjacent space. Thus, the device may be installed in the corridor, outside of the isolation room. The inclined conduit is installed with a downward orientation such that the end of the conduit that is closer to the wall toward the isolation room is at a higher position than the opposite end of the conduit that is away from the wall in the corridor.

When the net directional differential pressure between the isolation room and the outside space is zero (e.g., a door between the room and the outside space is opened), or the pressure in the isolation room is greater than the adjacent spaces, the ball will fall to the lower end of the conduit such that an observer in the corridor would see the ball at the bottom of the lower end, farthest away from the wall. When the appropriate degree of negative pressure is applied to the room to overcome gravity and the device characteristics, the ball moves upwardly within the conduit toward the wall to the vertically higher end of the inclined conduit. That is, the difference between the pressure of the isolation room and the pressure in the corridor outside on the opposite side of the wall causes forces on the ball that are sufficient to move the ball upwardly, thereby indicating that at least the appropriate direction of air flow through an opening between the rooms and degree of negative pressure is applied to the isolation room to prevent the escape of infectious pathogen air in the isolation room. It should be noted that the communicating conduit can not only be through one wall or barrier and sense the pressure conditions on each side, but, in some embodiments, the conduit may leave a room and pass through adjacent spaces and open to a space not immediately adjacent to the initial room.

In the case of a hospital operating room that is required to exhibit a positive pressure, so as to substantially prevent potentially contaminated air from flowing into the room from a surrounding space, the device may be installed in the corridor outside of the operating room such that the end of the conduit that extends toward the operating room is at a lower position than the opposite end of the conduit that extends away from the operating room and into the corridor. Thus, when a suitable amount of positive pressure is applied to the operating room, there is sufficient directional differential pressure to move the ball upwardly, farthest away from the wall to the higher end of the conduit.

The inclined conduit containing the ball may be clear to allow visibility of the position of the ball. The conduit may be of a length that is twice as long as the diameter of the ball in some embodiments. The conduit may have an opaque cover at the half-end of the conduit closest to the wall the device is mounted to on one side of the wall. When the ball travels to a position closest to the wall, the ball may be hidden when the device is viewed from the side. This feature facilitates a view of the position of the ball.

When installed, the conduit may be oriented at an appropriate angle of inclination that corresponds to the desired threshold differential pressure set point. In some embodiments, the desired differential pressure set point may be between 0.001 inch of $H_2O$ and 10 inches of $H_2O$ (e.g., between 0.001 inch of $H_2O$ and 1 inch of $H_2O$, between 0.001 inch of $H_2O$ and 5 inch of $H_2O$, between 0.005 inches of $H_2O$ and 0.5 inches of $H_2O$, between 0.1 inch of $H_2O$ and 0.5 inches of $H_2O$, between 0.01 inch of $H_2O$ and 0.1 inches of $H_2O$, between 0.01 inch of $H_2O$ and 0.05 inches of $H_2O$, between 0.01 inch of $H_2O$ and 0.03 inches of $H_2O$, between 0.005 inches of $H_2O$ and 0.1 inch of $H_2O$, between 0.001 inch of $H_2O$ and 0.005 inches of $H_2O$, between 0.001 inch of $H_2O$ and 0.003 inches of $H_2O$, etc.), as measured by a standard water column manometer. It will be appreciated that devices of the present disclosure may provide an indication of other differential pressures between adjacent spaces outside of these ranges.

Physical features other than the incline of the conduit may provide an indication of whether the directional differential pressure between spaces meets a certain threshold. For instance, the type of ball placed within the conduit may be chosen based on particular characteristics, such as weight or surface finish of the ball. For example, a greater differential pressure will be required to move a heavier ball from a lower region of the conduit to a higher region of the conduit. Conversely, if the ball is lighter, a smaller differential pressure will be required to move the ball toward the higher end of the conduit. Alternatively, a ball having a rough surface finish may require a greater degree of air flow provided through differential pressure to move the ball toward the higher end of the conduit. Accordingly, different balls, or movable elements, may be marked according to the range of differential pressure that the detector, incorporating the particular ball(s), may indicate. For example, two or more movable elements having different weights may be provided, each with a different color and/or markings. The markings may indicate what threshold differential pressure set point is set when the particular movable element (e.g., ball) is used in the conduit. When the device is configured to permit only one inclination, the movable element may have a pressure marking directly on the movable element. A user may select which movable element (e.g., ball) to place in the device from among a plurality of movable elements of different weights. Or the user may select which movable element (e.g., ball) to place in the device from among a plurality of movable elements having different diameters. In this manner, a second ball may be swapped for a first ball by removing the first ball from the conduit and inserting the second ball into the conduit. Other parameters may include the diameter of a ball and the inside diameter of the inclined conduit containing the ball.

Screws may be used to mount a baseplate to a wall, though other suitable fasteners may be used. It should be noted that while screws are shown in exemplary embodiments described herein, any suitable arrangement may be employed to join various components.

The conduit(s) of exemplary embodiments described herein may include any suitable material. In some embodiments, the conduit(s) may be made up of glass, plastic, or another appropriate material. In some cases, the conduit(s) may be transparent or translucent so that the movable element within the conduit is viewable to an observer. In some embodiments, the conduit(s) are rigid, though, in various embodiments, the conduit(s) are flexible. The device may include a combination of rigid and flexible conduits. For example, a flexible conduit may be used within a barrier as part of a connection between a first space on one side of the barrier and a second space on the other side of the barrier. The flexible conduit may connect to a collar on the back side of baseplate in some embodiments. A conduit need not be cylindrical in shape as any suitable shape may be used.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A mounting device for mounting a differential pressure indication device for indicating a presence of a directional differential pressure between a first space and a second space separated from the first space by a barrier, the mounting device comprising:
   a base configured to be mounted against the barrier, wherein the base includes a receptacle configured to receive the differential pressure indication device;
   at least one mounting fastener configured to removably secure the differential pressure indication device within the receptacle;
   a pitch adjuster configured to secure the base to the barrier, wherein movement of the pitch adjuster is configured to adjust a spacing between a portion of the base and the barrier to adjust a pitch of the base;
   at least one mounting opening formed in the base and configured to receive a fastener;
   a pitch indicator disposed on the base and configured to indicate an orientation of the base with respect to pitch; and
   a roll indicator disposed on the base and configured to indicate an orientation of the base with respect to roll.

2. The mounting device of claim 1, wherein the receptacle is cylindrical.

3. The mounting device of claim 1, wherein the base includes at least one device mounting hole, wherein the at least one mounting fastener is configured to engage the at least one device mounting hole.

4. The mounting device of claim 1, wherein the at least one mounting fastener is at least one tab configured to cover a portion of the receptacle to secure the differential pressure indication device within the receptacle.

5. The mounting device of claim 4, wherein the at least one tab is configured to rotate between a locked position and an unlocked position, wherein in the locked position the at least one tab covers the portion of the receptacle, and wherein in the unlocked position the at least one tab does not cover the portion of the receptacle.

6. The mounting device of claim 1, wherein the receptacle is configured to rotatably support the differential pressure indication device, such that the differential pressure indication device may rotate about a rotation axis.

7. The mounting device of claim 6, wherein the base includes an arrow configured to point one of a plurality of markings disposed on the differential pressure indication device.

8. The mounting device of claim 1, wherein the pitch indicator is a bubble level.

9. The mounting device of claim 1, wherein the roll indicator is a bubble level.

10. The mounting device of claim 1, wherein the pitch indicator and the roll indicator are a single multi-axis bubble level.

11. The mounting device of claim 1, wherein the at least one mounting opening is an arc-shaped slot.

12. The mounting device of claim 1, wherein the pitch adjuster includes:
    a bolt including a head and a shaft, wherein the shaft includes a notch; and
    a clip disposed in the notch, wherein the head is disposed on a first side of the base, and wherein the clip is disposed on a second, opposing side of the base.

13. The mounting device of claim 12, wherein rotation of the pitch adjuster is configured to adjust the spacing between the portion of the base and the barrier.

14. The mounting device of claim 1, wherein the base includes a curved surface facing the barrier, wherein the curved surface is configured to allow the base to rotate with respect to pitch when the pitch adjuster is moved to adjust the spacing between the base and the barrier.

15. The mounting device of claim 1, further comprising a compressible gasket disposed between the base and the barrier, wherein the compressible gasket is configured to compress when the pitch adjuster is moved to adjust the spacing between the base and the barrier.

16. The mounting device of claim 1, further comprising a fire-resistant layer disposed on the base and configured to contact the barrier, wherein the fire-resistant layer is configured to inhibit travel of smoke or fire from the first space to the second space.

17. The mounting device of claim 1, wherein the base comprises a passageway configured to configured to fluidically connect the differential pressure indication device to the first space and the second space.

18. A system comprising:
a differential pressure indication device for indicating a presence of a directional differential pressure between a first space and a second space separated from the first space by a barrier, comprising:
a mount,
a conduit portion in fluidic connection with the first space and the second space, wherein the conduit portion is connected to the mount, and
a movable element disposed within the conduit portion and movable from a first, vertically lower region of the conduit portion to a second, vertically higher region of the conduit portion in response to the directional differential pressure between the first space and the second space being greater than a threshold differential pressure; and
a mounting device for mounting the differential pressure indication device to the barrier, comprising:
a base configured to be mounted against the barrier, wherein the base includes a receptacle in which the mount is removably disposed,
at least one mounting fastener configured to removably secure the mount within the receptacle,
a pitch adjuster configured to secure the base to the barrier, wherein movement of the pitch adjuster is configured to adjust a spacing between a portion of the base and the barrier to adjust a pitch of the base,
a pitch indicator disposed on the base and configured to indicate an orientation of the base with respect to pitch, and
a roll indicator disposed on the base and configured to indicate an orientation of the base with respect to roll.

19. The system of claim 18, wherein the mount and the receptacle have corresponding shapes.

20. The system of claim 19, wherein the mount and the receptacle are cylindrical.

21. The system of claim 18, wherein the mount includes at least one mount hole, wherein the base includes at least one device mounting hole, wherein the at least one mounting fastener is configured to engage the at least one mount hole and the at least one device mounting hole, and wherein the conduit portion is inclined at an angle relative to a horizontal plane when the mount is oriented vertically.

22. The system of claim 18, wherein the at least one mounting fastener is at least one tab configured to cover a portion of the mount to secure the differential pressure indication device within the receptacle.

23. The system of claim 22, wherein the at least one tab is configured to rotate between a locked position and an unlocked position, wherein in the locked position the at least one tab covers the portion of the mount, and wherein in the unlocked position the at least one tab does not cover the portion of the mount.

24. The system of claim 18, wherein the receptacle is configured to rotatably support the differential pressure indication device such that the mount may rotate about a rotation axis, wherein rotation of the mount about the rotation axis adjusts an inclination of the conduit portion.

25. The system of claim 24, wherein the rotation axis is transverse to the barrier.

26. The system of claim 25, wherein the rotation axis is perpendicular to the barrier.

27. The system of claim 24, wherein the mount includes a plurality of markings configured to indicate a threshold differential pressure set point, wherein the base includes an arrow configured to point one of the plurality of markings.

28. The system of claim 27, wherein the mount includes a movable marker configured to point to one of the plurality of markings.

29. The system of claim 18, wherein the pitch indicator is a bubble level.

30. The system of claim 18, wherein the roll indicator is a bubble level.

31. The system of claim 18, wherein the pitch indicator and the roll indicator are a single multi-axis bubble level.

32. The system of claim 18, wherein the base includes an arc-shaped slot configured to receive a fastener.

33. The system of claim 18, wherein the pitch adjuster includes:
a bolt including a head and a shaft, wherein the shaft includes a notch; and
a clip disposed in the notch, wherein the head is disposed on a first side of the base, and wherein the clip is disposed on a second, opposing side of the base.

34. The system of claim 33, wherein rotation of the pitch adjuster is configured to adjust the spacing between the portion of the base and the barrier.

35. The system of claim 18, wherein the base includes a curved surface facing the barrier, wherein the curved surface is configured to allow the base to rotate with respect to pitch when the pitch adjuster is moved to adjust the spacing between the base and the barrier.

36. The system of claim 18, further comprising a compressible gasket disposed between the base and the barrier, wherein the compressible gasket is configured to compress when the pitch adjuster is moved to adjust the spacing between the base and the barrier.

37. The system of claim 18, further comprising a fire-resistant layer disposed on the base and configured to contact the barrier, wherein the fire-resistant layer is configured to inhibit travel of smoke or fire from the first space to the second space.

38. The system of claim 18, wherein the base comprises a passageway configured to configured to fluidically connect the differential pressure indication device to the first space and the second space.

39. The system of claim 18, wherein the conduit portion is transverse to the barrier.

40. The system of claim 18, wherein the conduit portion is parallel to the barrier.

41. A differential pressure indication device for indicating a presence of a directional differential pressure between a first space and a second space separated from the first space by a barrier, the device comprising:
a mount configured to be mounted to the barrier;
a pitch adjuster configured to secure the mount to the barrier, wherein movement of the pitch adjuster is configured to adjust a spacing between a portion of the mount and the barrier to adjust a pitch of the mount;

a conduit portion in fluidic connection with the first space and the second space, wherein the conduit portion is connected to the mount; and a movable element disposed within the conduit portion and movable from a first, vertically lower region of the conduit portion to a second, vertically higher region of the conduit portion in response to the directional differential pressure between the first space and the second space being greater than a threshold differential pressure.

42. The differential pressure indication device of claim 41, further comprising a pitch indicator associated with the mount and configured to indicate an orientation of the mount with respect to pitch.

43. The differential pressure indication device of claim 41, further comprising a roll indicator associated with the mount and configured to indicate an orientation of the mount with respect to roll.

44. The differential pressure indication device of claim 41, wherein the mount is configured to be rigidly mounted to the barrier, and wherein the conduit portion is inclined at an angle relative to a horizontal plane when the mount is oriented vertically.

45. The differential pressure indication device of claim 41, wherein the mount is configured to be rotatably mounted to the barrier.

46. The differential pressure indication device of claim 41, further comprising a fire-resistant layer disposed on the mount and configured to contact the barrier, wherein the fire-resistant layer is configured to inhibit travel of smoke or fire from the first space to the second space.

47. The differential pressure indication device of claim 41, wherein the mount comprises a passageway configured to configured to fluidically connect the conduit portion to the first space and the second space.

48. The differential pressure indication device of claim 41, wherein the conduit portion is transverse to the barrier.

49. The differential pressure indication device of claim 41, wherein the conduit portion is parallel to the barrier.

50. A differential pressure indication device for indicating a presence of a directional differential pressure between a first space and a second space separated from the first space by a barrier, the device comprising:

a mount configured to be mounted to the barrier, wherein the mount includes a receptacle and a passageway;

a conduit portion in fluidic connection with the first space and the second space, wherein the conduit portion is received in the receptacle to connect the conduit portion to the mount, wherein the passageway is configured to fluidically connect the conduit portion to the second space, and wherein the passageway receives at least a portion of the conduit portion; and a movable element disposed within the conduit portion and movable from a first, vertically lower region of the conduit portion to a second, vertically higher region of the conduit portion in response to the directional differential pressure between the first space and the second space being greater than a threshold differential pressure.

51. The differential pressure indication device of claim 50, wherein a receptacle plane aligned with the receptacle separates the first, vertically lower region of the conduit portion from the second, vertically higher region of the conduit portion.

52. The differential pressure indication device of claim 51, wherein the movable element is configured to move between a first indication position and a second indication position, wherein in the first indication position the movable element is configured to be disposed on a first side of the receptacle plane, and wherein in the second indication position the movable element is configured to be disposed on a second side of the receptacle plane.

53. The differential pressure indication device of claim 50, wherein a barrier plane aligned with a surface of the barrier separates the first, vertically lower region of the conduit portion from the second, vertically higher region of the conduit portion.

54. The differential pressure indication device of claim 53, wherein the movable element is configured to move between a first indication position and a second indication position, wherein in the first indication position the movable element is configured to be disposed on a first side of the barrier plane, and wherein in the second indication position the movable element is configured to be disposed on a second side of the barrier plane.

55. The differential pressure indication device of claim 54, wherein in the second indication position the movable element is configured to be concealed within the barrier.

56. The differential pressure indication device of claim 50, wherein the conduit portion is transverse to the barrier.

57. The differential pressure indication device of claim 50, wherein the conduit portion is removable from the receptacle and the passageway.

58. The differential pressure indication device of claim 50, further comprising a pitch indicator associated with the mount and configured to indicate an orientation of the mount with respect to pitch.

59. The differential pressure indication device of claim 50, further comprising a roll indicator associated with the mount and configured to indicate an orientation of the mount with respect to roll.

60. The differential pressure indication device of claim 50, further comprising a pitch adjuster configured to secure the mount to the barrier, wherein movement of the pitch adjuster is configured to adjust a spacing between a portion of the mount and the barrier to adjust a pitch of the mount.

* * * * *